United States Patent
Nozaki et al.

(10) Patent No.: US 8,916,663 B2
(45) Date of Patent: *Dec. 23, 2014

(54) PRODUCTION METHOD OF COPOLYMER OF ALLYL MONOMER CONTAINING POLAR GROUP

(75) Inventors: Kyoko Nozaki, Tokyo (JP); Shingo Ito, Tokyo (JP); Yoshikuni Okumura, Oita (JP); Junichi Kuroda, Oita (JP)

(73) Assignees: The University of Tokyo, Tokyo (JP); Showa Denko K.K., Tokyo (JP)

(*) Notice: Subject to any disclaimer, the term of this patent is extended or adjusted under 35 U.S.C. 154(b) by 220 days.

This patent is subject to a terminal disclaimer.

(21) Appl. No.: 13/382,435

(22) PCT Filed: Aug. 26, 2010

(86) PCT No.: PCT/JP2010/064980
§ 371 (c)(1), (2), (4) Date: Jan. 5, 2012

(87) PCT Pub. No.: WO2011/025053
PCT Pub. Date: Mar. 3, 2011

(65) Prior Publication Data
US 2012/0116036 A1 May 10, 2012

(30) Foreign Application Priority Data
Aug. 28, 2009 (JP) .................. 2009-198533

(51) Int. Cl.
C08F 4/70 (2006.01)

(52) U.S. Cl.
USPC ........ 526/172; 526/161; 526/169.1; 526/348; 526/318; 526/310

(58) Field of Classification Search
USPC .......... 556/136; 526/172, 161, 330, 332, 310, 526/291
See application file for complete search history.

(56) References Cited

U.S. PATENT DOCUMENTS

| 4,423,196 A | 12/1983 | Arlt et al. |
| 7,435,701 B2 * | 10/2008 | Shen et al. .................... 502/113 |
| 2005/0143537 A1 | 6/2005 | Liu et al. |

FOREIGN PATENT DOCUMENTS

| CN | 1887924 A | 1/2007 |
| EP | 0 272 727 A2 | 6/1988 |

(Continued)

OTHER PUBLICATIONS

Nozaki et al. (JP 2007-046032) Feb. 22, 2007; abstract and translation in English.*

(Continued)

*Primary Examiner* — Rip A. Lee
(74) *Attorney, Agent, or Firm* — Sughrue Mion, PLLC

(57) ABSTRACT

The present invention relates to a method for producing a high-molecular-weight copolymer of polar group-containing allyl monomers including monomer units represented by formulae (3) and (4) (in the formulae, $R^1$ represents a hydrogen atom (H) or hydrocarbon group having 1 to 6 carbon atoms; $R^2$ represents —OH, —OCOR$^3$ ($R^3$ represents hydrocarbon group having 1 to 5 carbon atoms), —N(R$^4$)$_2$ ($R^4$ represents a hydrogen atom or hydrocarbon group having 1 to 5 carbon atoms); and n and m are a value representing the molar ratio of each of the monomer units), which has few branches and unsaturated group at the molecular end, by copolymerizing olefin and a polar group-containing allyl compound using a metal complex of group 10 elements in the periodic system represented by formula (I) as a catalyst.

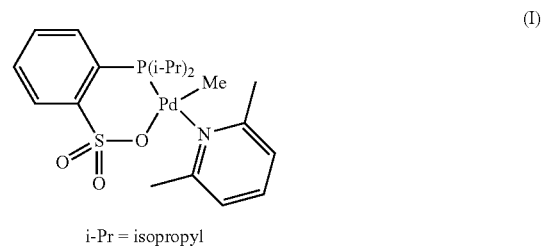

i-Pr = isopropyl

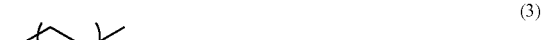

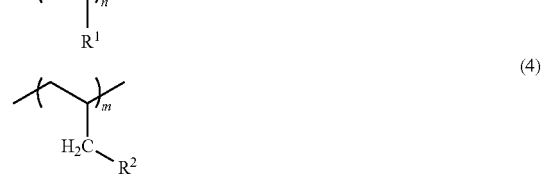

7 Claims, 8 Drawing Sheets

(56) References Cited

FOREIGN PATENT DOCUMENTS

| JP | 2003-231710 A | | 8/2003 | |
|----|---------------|---|--------|---|
| JP | 2003-252930 A | | 9/2003 | |
| JP | 2006-265541 A | | 10/2006 | |
| JP | 2007-046032 A | | 2/2007 | |
| JP | 2007-046032 A | * | 2/2007 | ............... C08F 4/80 |
| WO | WO 2006/093213 A1 | * | 9/2006 | ............... C08F 4/70 |
| WO | WO 2010/058849 A1 | * | 5/2010 | ............... C07F 9/50 |

OTHER PUBLICATIONS

Skupov et al. Macromol. Rapid Commun. 2007, 28, 2033-2038.*
Kochi, Y.; Yoshimura, K.; Nozaki, K. Dalton Trans. 2006, 25-27.*
Kochi, Y.; Noda, S.; Yoshimura, K.; Nozaki, K. J. Am. Chem. Soc. 2007, 129, 8948-8949.*
Luo et al. J. Am. Chem. Soc. 2007, 129, 8946-8947.*
Weng et al. J. Am. Chem. Soc. 2007, 129, 15450-15451.*
Nakamura et al. J. Am. Chem. Soc. 2008, 130, 8128-8129.*
Guironnet et al. J. Am. Chem. Soc. 2009, 131, 422-433.*
Ito, S.; Munakata, K.; Nakamura, A.; Nozaki, K. J. Am. Chem. Soc. 2009, 131, 14606-14607.*
Bouilhac et al. Macromolecules 2010, 43, 3589-3590.*
Hearley et al. Organometallics 2005, 24, 2755-2763.*
Liu et al. Organometallics 2007, 26, 210-216.*
Vela et al. Organometallics 2007, 26, 6624-6635.*
Borkar et al. Organometallics 2008, 27, 3331-3334.*
Piche et al. Polymer Preprints 2008, 49, 357-358.*
Jun-Ichi Imuta et al., "Catalytic Regioselective Introduction of Ally Alcohol into the Nonpolar Polyolefins: Development of One-Pot Synthesis of Hydroxyl-Capped Polyolefins Mediated by a New Metallocene IF Catalyst", J. Am Chem. Soc., 2002, pp. 1176-1177, vol. 124, No. 7.
Kirill M. Skupov et al., "Palladium Aryl Sulfonate Phosphine Catalysts for the Copolymerization of Acrylates with Ethene", Macromolecular Rapid Communications, 2007, pp. 2033-2038, vol. 28, Issue 20.
Lynda K. Johnson, et al., "Copolymerization of Ethylene and Propylene with Functionalized Vinyl Monomers by Palladium(II) Catalysts", J. Am Chem. Soc., 1996, pp. 267-268, vol. 118, No. 1.
Takuya Kochi et al., "Formation of Linear Copolymers of Ethylene and Acrylonitrile Catalyzed by Phosphine Sulfonate Palladium Complexes", J. Am Chem. Soc., 2007, pp. 8948-8949, vol. 129, No. 29.
Yu-Hua Shan et al., "Ethylene Polymerization and Copolymerization with Polar Monomers by a Neutral Nickel Catalyst Combined with Co-Catalyst of Ni(COD)2 or AL(i-Bu)3", Chinese Journal of Polymer Science, Jan. 2005, pp. 301-310, vol. 23, No. 3.

* cited by examiner

PRODUCTION METHOD OF COPOLYMER OF ALLYL MONOMER CONTAINING POLAR GROUP

CROSS REFERENCE TO RELATED APPLICATIONS

This application is a National Stage of International Application No. PCT/JP2010/064980 filed Aug. 26, 2010, the contents of which are incorporated herein by reference in their entirety.

TECHNICAL FIELD

The present invention relates to a production method of copolymers of allyl monomer containing polar group and to the copolymers obtained by the method.

BACKGROUND ART

Copolymers of olefin such as ethylene and propylene which is a nonpolar monomer and a vinyl monomer containing polar group have been widely known. Specifically, ethylene-vinyl alcohol copolymers (EVOH) are random copolymer comprising ethylene and vinyl alcohol and synthesized by saponifying ethylene-vinyl acetate copolymers obtained by radical copolymerization of ethylene and vinyl acetate. EVOH is used in a wide range of fields for purposes such as food packages by taking advantage of its excellent gas barrier property.

It is widely known that copolymers obtained by copolymerization of ethylene through radical polymerization generate short-chain branches and long-chain branches by back biting reaction. For example, in the case of EVOH, it has been reported that about 1 mol % of alkyl branches and about 0.1 to 0.2 mol % of acetoxyl branches are present in EVOH containing about 30 mol % of ethylene (Nihon Kagaku Gakkaisi, 11, 1698 (1977)). It is known that generally, presence of branches in the polymer chain incurs decrease in the degree of crystallization and changes in the properties of the polymer.

The polymerization of monomers containing allyl group is more difficult compared to that of vinyl monomers, and the polymer of allyl group-containing monomers has been almost unheard. The main reason for this is that the polymer propagation reaction proceeds very slowly due to the degenerative chain transfer reaction to monomer and hence only oligomers having low degree of polymerization have been obtained (Chem. Rev. 58, 808 (1958)).

JP-A-S58-49792 discloses a copolymer of ethylene and allyl acetate and a tripolymer of ethylene, allyl acetate and vinyl acetate as a hydrocarbon oil composition. The synthesizing method thereof is radical polymerization, and a low-molecular-weight substance having limiting viscosity of about 0.12 dl/g was obtained in Examples.

JP-A-2005-514083 discloses synthesis of ethylene-allyl alcohol copolymer aiming for higher hydrophobicity compared to EVOH as a coating material for medical instruments. The synthesis method is different from that of the present invention, which aims to directly obtain polymers by polymerization of allyl monomers, and the targeted polymer is obtained in JP-A-2005-514083 by reduction reaction after the radical copolymerization of ethylene and acrylic acid. However, the method had a problem that the reduction reaction of the polymer cost too much. Furthermore, since the polymer is synthesized by radical polymerization, the polymer skeleton is presumed to have a branched structure.

Copolymerization of polar group-containing monomer by coordination polymerization using a Ziegler-Natta catalyst and a metallocene catalyst is difficult to conduct under general conditions since the polar group becomes a catalyst poison, which is different from radical polymerization. U.S. Pat. No. 4,423,196 (Patent Document 1) discloses copolymers of propylene and allyl alcohol which are obtained by polymerization using $TiCl_3$-type Ziegler-Natta catalyst. The polymerization reaction proceeds by using equimolar organic aluminum compound to allyl alcohol and by protecting the alcohol moiety with organic aluminum. Though the publication does not have description regarding the molecular weight distribution, the polymer contains 98% of isotactic fraction and is presumed to be a polymer having a wide-range of molecular weight distribution and composition distribution.

Polymerization of nonpolar vinyl monomer such as ethylene and propylene and polar monomer has also been attempted using single-site catalysts which have been developed recent years.

It has been conventionally known that the catalyst using metal complex of group 4 elements has high polymerization activity to monomers such as ethylene and propylene and there has also been a disclosure of copolymerization of polar group-containing monomers. In the copolymerization of ethylene and polar group-containing monomer using a metallocene catalyst of group 4 elements, it was necessary to use organic aluminum in at least an equimolar amount to allyl alcohol, which aluminum functions as a protecting group for the polar group-containing monomer against the catalyst. As a result, the reaction of chain transfer to organic aluminum dominantly terminated the propagation reaction, and only a saturated terminal bond was observed in a terminal structure of the polymer while a terminal double bond by β-hydrogen elimination was not. In this case, it leads to cost increases due to the use of organic aluminum in excess; the fact that the copolymerization of the polar group-containing monomers cannot be high by the factor that the concentration of polar group-containing monomers cannot be increased; and cost increases in recovering unreacted monomers after the polymerization reaction, which become problems in achieving practical use of the method.

JP-A-2003-252930 (Patent Document 2) and J. Am Chem. Soc., 124, 1176 (2002) (Non-patent Document 1) disclose an olefin polymer containing two polar groups at position of ω of the main chain of the olefin polymer using metallocene complex of group 4 elements having a specific structure; an olefin polymer containing a polar group at position of ω and at least one position of (ω−n) (n≥1); and a production method thereof. By the analysis of the terminal structure of the polymer, it has been confirmed that only a saturated bond exists at the molecular chain terminal while an unsaturated bond does not. The allyl alcohol content in the polyethylene main chain of the copolymer obtained by copolymerization of ethylene and allyl alcohol using a zirconocene catalyst having a specific structure, which copolymer described in Examples, is within the range of from 0.2 to 1.2 mol %. Also, organic aluminum is used in at least an equimolar amount to allyl alcohol.

JP-A-2006-265541 (Patent Document 3) describes a method for producing a polar olefin copolymer using a metal complex of groups 4 to 5 elements having a specific structure. Examples disclose copolymerization of ethylene and allyl chloride, ethylene and allyl acetate, and ethylene and allyl alcohol. In the copolymerization of ethylene and allyl chloride, the allyl content in the main chain of polyethylene is from 0.1 to 0.3 mol %; and organic aluminum is used in at least an equimolar amount to an allyl compound.

JP-A-2003-231710 (Patent Document 4) discloses a method for producing a copolymer of olefin and a polar vinyl monomer using a catalyst comprising a lamellar compound. Examples describe copolymerization of propylene and allyl alcohol, wherein the allyl alcohol content in the polymer is as small as 0.3% or less and organic aluminum is used.

It is generally known that the polar group-containing monomer can be copolymerized without using organic aluminum as a protective group in the catalyst system using late transition metal. Examples include copolymerization of ethylene and acrylic acid ester, acrylonitrile, vinyl acetate and the like (J. Am. Chem. Soc., 118, 267 (1996) (Non-patent Document 2); J. Am. Chem. Soc., 129, 8948 (2007) (Non-patent Document 3; JP-A-2007-046032 (Patent Document 5)). However, conventionally, not only that activity is low but that polymerization activity reduces during the long time period of polymerization in the catalyst system using late transition metal, and therefore the cost of catalyst using expensive late transition metal complex is quite high and the method has a problem to be industrially used.

On the other hand, in the case of allyl compound, the copolymerization reaction of an allyl compound and olefin, which is an objective of the present invention, has been almost unheard because the reaction could proceed in a different format other than the polymerization reaction at olefin moiety: i.e. an oxidative addition reaction of an allyl compound to late transition metal.

PRIOR ART

Patent Document

[Patent Document 1] U.S. Pat. No. 4,423,196
[Patent Document 2] JP-A-2003-252930
[Patent Document 3] JP-A-2006-265541
[Patent Document 4] JP-A-2003-231710
[Patent Document 5] JP-A-2007-46032

Non-Patent Document

[Non-patent Document 1] J. Am. Chem. Soc., 124, 1176 (2002)
[Non-patent Document 2] J. Am. Chem. Soc., 118, 267 (1996)
[Non-patent Document 3] J. Am. Chem. Soc., 129, 8948 (2007)

SUMMARY OF THE INVENTION

Problems to be Solved by the Invention

An objective of the present invention is to provide a high molecular weight allyl copolymer containing polar group and having a novel structure, which copolymer is available for various applications and the synthesis thereof has been considered to be difficult by a polymerization method such as radical polymerization other than that of the present invention; and a production method thereof.

Means to Solve the Problem

As a result of intensive studies to solve the above-mentioned problem, the present inventors have found that a novel copolymer of the allyl monomer containing a polar group, which copolymer has a novel structure and is available for various applications, can be provided by polymerizing polar group-containing allyl monomer using a metal complex of group 10 elements as a catalyst component, which is different from the conventional radical polymerization method and the method using an early transition metal catalyst. The present inventors accomplished the present invention based on this finding.

That is, the present invention relates to the following [1] to [15]:

[1] A method for producing a copolymer of polar group-containing allyl monomers having monomer units represented by formulae (3) and (4)

(in the formulae, $R^1$ represents a hydrogen atom or hydrocarbon group having 1 to 6 carbon atoms;
$R^2$ represents —OH, —OCOR$^3$ ($R^3$ represents hydrocarbon group having 1 to 5 carbon atoms), —N(R$^4$)$_2$ ($R^4$ represents a hydrogen atom, hydrocarbon group having 1 to 5 carbon atoms, aromatic residue having 6 to 18 carbon atoms or —COOR$^{10}$ ($R^{10}$ represents hydrocarbon group having 1 to 10 carbon atoms or aromatic residue having 6 to 10 carbon atoms) and two R$^4$s may be the same or different from each other) or a halogen atom; and n and m are a value representing the molar ratio of each of the monomer units),
comprising copolymerization of olefin represented by formula (1)

$$CH_2{=}CHR^1 \qquad (1)$$

(in the formula, $R^1$ has the same meaning as described above) and an allyl compound represented by formula (2)

$$CH_2{=}CHCH_2R^2 \qquad (2)$$

(in the formula, $R^2$ has the same meaning as described above) using as a catalyst a metal complex represented by formula (C1)

(in the formula, M represents a metal atom of group 10 element in the periodic system; X represents a phosphorous atom (P) or an arsenic atom (As); $R^5$ represents a hydrogen atom or hydrocarbon group having 1 to 30 carbon atoms which may be substituted by one or more groups selected from a halogen atom, alkoxy group, aryloxy group and acyloxy group; Y, $R^6$ and $R^7$ independently represent a hydrogen atom, alkoxy group, aryloxy group, silyl group, amino group or hydrocarbon group having 1 to 30 carbon atoms which may be substituted by one or more groups selected from a halogen atom, alkoxy group and aryloxy group; and $R^6$ and $R^7$ may bond to each other to form a ring structure. Q represents a bivalent group indicated in the brackets of Z[—S(=O)$_2$—O-]M, Z[—C(=O)—O-]M, Z[—P(=O)(—OH)—O-]M or Z[—S-]M (Z and M at the beginning and at the end of the formulae are described to show the coupling direction of the groups). Z represents a hydrogen atom or a hydrocarbon group having 1 to 40 carbon atoms which may be substituted by one or more groups selected from a halogen atom, alkoxy group and aryloxy group. Y and Z may bond to each other to form a ring structure. $R^6$ and/or $R^7$ may bond to Y to form a ring structure. L represents an electron-donating ligand and q is 0, ½, 1 or 2).

[2] The method for producing a copolymer as described in [1] above, wherein the catalyst represented by formula (C1) is represented by formula (C2)

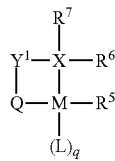

(C2)

(in the formula, $Y^1$ represents bivalent hydrocarbon group having 1 to 70 carbon atoms which may be substituted by one or more groups selected from a halogen atom, alkoxy group and aryloxy group; Q, M, X, $R^5$, $R^6$, $R^7$, L and q have the same meanings as in [1] above).

[3] The method for producing a copolymer as described in [2] above, wherein Q in formula (C2) is —SO$_2$—O— (in which S bonds to $Y^1$ and O bonds to M).

[4] The method for producing a copolymer as described in [3] above, wherein the catalyst represented by formula (C2) is represented by formula (C3)

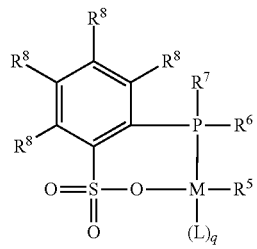

(C3)

(in the formula, four $R^8$s independently represent a hydrogen atom, alkyl group having 1 to 8 carbon atoms, alkoxy group having 1 to 8 carbon atoms, aryloxy group having 6 to 18 carbon atoms or a halogen atom; and M, $R^5$, $R^6$, $R^7$, L and q have the same meanings as in [1] above).

[5] The method for producing a copolymer as described in [4] above, wherein both of $R^6$ and $R^7$ in formula (C3) represent cyclohexyl group, cyclopentyl group, isoproryl group, o-methoxyphenyl group, 2',6'-dimethoxy-2-biphenyl group; and all of $R^8$s are a hydrogen atom or one of $R^8$s is ethyl group while the other three $R^8$s are a hydrogen atom).

[6] The method for producing a copolymer as described in any one of [1] to [5] above, wherein M is Pd.

[7] The method for producing a copolymer as described in any one of [1] to [3] above, wherein X is P.

[8] A copolymer of polar group-containing allyl monomers obtained by a production method as described in any one of [1] to [7] above.

[9] A copolymer of polar group-containing allyl monomers, which is a copolymer containing monomer units represented by formulae (3-1) and (4)

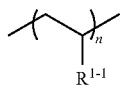

(3-1)

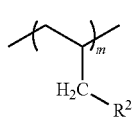

(4)

(in the formulae, $R^{1-1}$ represents a hydrogen atom or methyl group and $R^2$, n and m have the same meaning as in [1] above); (A) the main chain has one or less branch, which has two or more carbon atoms, per 1000 carbon atoms which constitute the main chain; and (B) the main chain has a carbon-to-carbon double bond at least at one end of the main chain.

[10] The copolymer of polar group-containing allyl monomers as described in [9] above which further has a structure that:
(C) the number average molecular weight in terms of polystyrene (Mn) is 1,000 or more and 1,000,000 or less;
(D) the molecular weight distribution (Mw/Mn) is 1.0 or more and 3.0 or less; and
(E) n and m representing the molar ratio of the monomer units represented by formulae (3-1) and (4) satisfy the following formula:

$$0.1 \le \{m/(m+n)\} \times 100 \le 50$$

[11] The copolymer of polar group-containing allyl monomers as described in [9] or [10] above, which contains only the monomer units represented by formulae (3-1) and (4).

[12] The copolymer of polar group-containing allyl monomers as described in [9] or [10] above, which contains monomer units represented by formulae (3-1), (4-1) and (4-2)

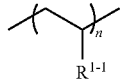

(3-1)

(4-1)

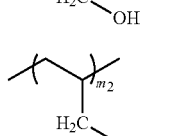

(4-2)

(in the formula, $R^{1-1}$ has the same meaning as described above; and n, $m_1$ and $m_2$ represent the molar ratio of each of the monomer units).

[13] The copolymer of polar group-containing allyl monomers as described in any one of [9] to [11] above, wherein $R^{1-1}$ in formula (3-1) is a hydrogen atom.

[14] The copolymer of polar group-containing allyl monomers as described in any one of [9] to [11] above, wherein the monomer unit represented by formula (4) is derived from at least one allyl compound selected from allyl acetate, allyl chloride, allyl bromide, allyl amine, N-allylaniline and N-t-butoxycarbonyl-N-allylamine.

[15] The copolymer of polar group-containing allyl monomers as described in any one of [9] to [11] above, wherein $R^{1-1}$ in formula (3-1) is a hydrogen atom and the monomer unit represented by formula (4) is derived from at least one allyl compound selected from allyl acetate, allyl chloride, allyl bromide, allyl amine, N-allylaniline and N-t-butoxycarbonyl-N-allylamine.

Effects of the Invention

A high molecular weight copolymer of allyl monomers containing a polar group can be obtained by the method of the present invention, wherein the polar group-containing allyl monomer and olefin are copolymerized using a metal complex of group 10 elements as a catalyst component, which copolymer was difficult to obtain by a conventional method. Particularly, the polymer containing structures of (A) and (B) described below can be directly obtained using the allyl polar group as one of the copolymerizable monomers.

That is, the polar group-containing allyl copolymer of the present invention contains:

(A) not a structure containing branches obtained by the conventional radical polymerization but a structure wherein the polymethylene structure in the main chain has a linear structure. This structure enables high crystallinity, thereby attaining various properties such as excellent mechanical strength; and (B) a double bond in the terminal structure of the polymer. The use of the terminal double bond enables necessary modification of a functional group, block copolymerization and star polymers.

Furthermore, though the present invention uses expensive late transition metal complex as a main component, it enables greatly reducing the catalyst cost by improving activity and dramatically improving the catalyst lifetime.

EMBODIMENT TO CARRY OUT THE INVENTION

[Monomer]

Figure 1:
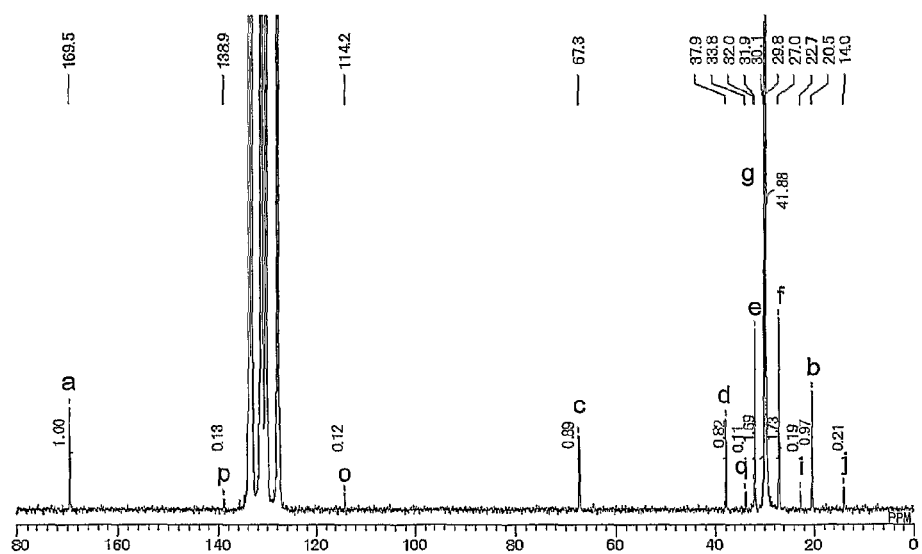
FIG. 1 The $^{13}$C-NMR spectrum of the ethylene/allyl acetate copolymer obtained in Example 1
Figure 2:
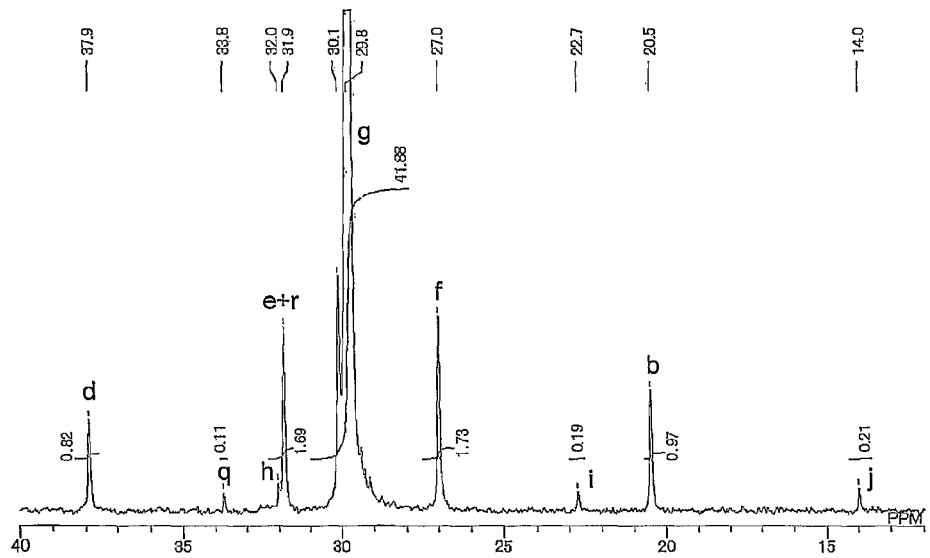
FIG. 2 An enlarged view of the portion at 12 to 40 ppm of FIG. 1

Olefin, which is one of the monomers used in the method for producing the copolymer of the present invention, is represented by formula (1).

$$CH_2=CHR^1 \qquad (1)$$

In formula (1), $R^1$ represents a hydrogen atom or hydrocarbon group having 1 to 6 carbon atoms and is preferably a hydrogen atom or alkyl group having 1 to 3 carbon atoms. Specifically, examples of olefin of formula (1) include ethylene, propylene, 1-butene, 1-hexene, 4-methyl-1-pentene and 1-octene. Among these, ethylene and propylene are particularly preferable. One of these compounds may be used independently or two or more of them may be used in combination.

A polar group-containing allyl compound, which is the other of the monomers used for polymerization in the present invention, is represented by formula (2).

$$CH_2=CHCH_2R^2 \qquad (2)$$

In formula (2), $R^2$ represents —OH, —OCOR$^3$ (R$^3$ represents hydrocarbon group having 1 to 5 carbon atoms), —N(R$^4$)$_2$ (R$^4$ represents a hydrogen atom, hydrocarbon group having 1 to 5 carbon atoms or aromatic residue having 6 to 18 carbon atoms or —COOR$^{10}$ (R$^{10}$ represents hydrocarbon group having 1 to 10 carbon atoms or aromatic residue having 6 to 10 carbon atoms), wherein two R$^4$s may by the same or different) or a halogen atom. R$^3$ is preferably alkyl group having 1 to 3 carbon atoms, particularly methyl group. R$^4$ is preferably a hydrogen atom, alkyl group having 1 to 3 carbon atoms or phenyl group. R$^{10}$ of —COOR$^{10}$ is preferably linear or branched alkyl group having 1 to 4 carbon atoms, phenyl group, benzyl group and the like. The halogen atom of R$^2$ is preferably chlorine or bromine.

Specific examples of the polar group-containing allyl compound represented by formula (2) include allyl acetate, allyl alcohol, allyl amine, N-allylaniline, N-t-butoxycarbonyl-N-allylamine, N-benzyloxycarbonyl-N-allylamine, N-benzyl-N-allylamine, allyl chloride and allyl bromide. Among these, allyl acetate and allyl alcohol are particularly preferable. One of these compounds may be used independently or two or more of them may be used in combination.

In addition to the compounds (monomers) represented by formulae (1) and (2), the other monomer may be incorporated to be copolymerized. The other monomers include acrylate ester, metacrylate ester, acrylonitrile, vinyl acetate and styrene.

Examples of the combination of olefin represented by formula (1) and the allyl compound represented by formula (2) include ethylene and allyl acetate; ethylene and ally alcohol; ethylene, allyl acetate and allyl alcohol; ethylene and allyl chloride; ethylene and allyl bromide; ethylene and allylamine, ethylene and N-allylaniline; ethylene and N-t-butoxycarbonyl-N-allylamine; ethylene and N-benzyloxycarbonyl-N-allylamine; ethylene and N-benzyl-N-allylamine; propylene and allyl acetate; propylene and ally alcohol; propylene, allyl acetate and allyl alcohol; propylene and allyl chloride; propylene and allyl bromide; propylene and allylamine; propylene and N-allylaniline; propylene and N-t-butoxycarbonyl-N-allylamine; propylene and N-benzyloxycarbonyl-N-allylamine; and propylene and N-benzyl-N-allylamine. Among these, preferred are ethylene and allyl acetate; ethylene and allyl alcohol; ethylene, allyl acetate and allyl alcohol; ethylene and allyl chloride; and ethylene and allylamine from the viewpoint of the polymer performance and economic efficiency.

[Catalyst]

The (structure of the) catalyst comprising metal complex of group 10 elements of the periodic system used in the present invention is represented by formula (C1).

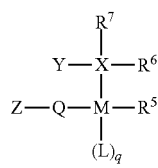

(C1)

In the formula, M represents a metal atom of group 10 elements in the periodic system. X represents a phosphorous (P) atom or an arsenic (As) atom. $R^5$ represents a hydrogen atom or a hydrocarbon group having 1 to 30 carbon atoms which may be substituted by one or more groups selected from a halogen atom, alkoxy group and aryloxy group. Y, $R^6$ and $R^7$ independently represent a hydrogen atom, alkoxy group, aryloxy group, silyl group, amino group, or a hydrocarbon group having 1 to 30 carbon atoms which may be substituted by one or more groups selected from a halogen atom, alkoxy group and aryloxy group. $R^6$ and $R^7$ may bond to each other to form a ring structure. Q represents a bivalent group indicated in the brackets of Z[—S(=O)$_2$—O-]M, Z[—C(=O)—O-]M, Z[—P(=O)(—OH)—O-]M or Z[—S-]M (Z and M at the beginning and at the end of the formulae are described to show the coupling direction of the groups). Z represents a hydrogen atom or a hydrocarbon group having 1 to 40 carbon atoms which may be substituted by one or more groups selected from a halogen atom, alkoxy group and aryloxy group. Y and Z may bond to each other to form a ring structure. $R^6$ and/or $R^7$ may bond to Y to form a ring structure. L represents an electron-donating ligand and q is 0, ½, 1 or 2. In the present specification, a "hydrocarbon group" includes saturated/unsaturated aliphatic carbon group and aromatic hydrocarbon group.

The structure of formula (C1) is described below.

M represents an element of group 10 in the periodic system. The elements of group 10 in the periodic system include Ni, Pd and Pt. From the viewpoint of the catalytic activity and obtained molecular weight, Ni and Pd are preferable, and Pd is particularly preferable.

X represents a phosphorous (P) atom or an arsenic (As) atom, wherein two electrons coordinate to M. P is preferred as X for reasons of availability and the catalyst cost.

Y, $R^6$ and $R^7$ each independently represent a hydrogen atom, alkoxy group, aryloxy group, silyl group, amino group, or a hydrocarbon group having 1 to 30 carbon atoms which may be substituted by one or more groups selected from a halogen atom, alkoxy group and aryloxy group. As the alkoxy group, preferred are those having 1 to 20 carbon atoms including methoxy group, ethoxy group, propoxy group and isopropoxy group. As the aryloxy group, preferred are those having 6 to 24 carbon atoms including phenoxy group. Examples of the silyl group include trimethyl silyl group, and examples of the amino group include amino group, methyl amino group and dimethyl amino group. $R^6$ and $R^7$ may be the same or different from each other. Also, $R^6$ and $R^7$ may bond to each other to form a ring structure. $R^6$ and/or $R^7$ may bond to Y to form a ring structure. Examples of the hydrocarbon group having 1 to 30 carbon atoms which may be substituted by one or more groups selected from a halogen atom, alkoxy group and aryloxy group in Y, $R^6$ and $R^7$ include alkyl group, aryl group, cycloalkyl group and furyl group. Specific examples of the alkoxy group and aryloxy group in the hydrocarbon group having 1 to 30 carbon atoms which may be substituted by one or more groups selected from a halogen atom, alkoxy group and aryloxy group are the same as those mentioned above. The halogen atom is preferably fluorine. From the viewpoint of the catalyst activity, alkyl group and aryl group are particularly preferable.

Specific examples of Y—X—$R^6$/$R^7$ moiety in which X is a phosphorous (P) atom, that is,

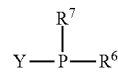

include the structures in the following formulae. Here, the bond between P and M are not shown.

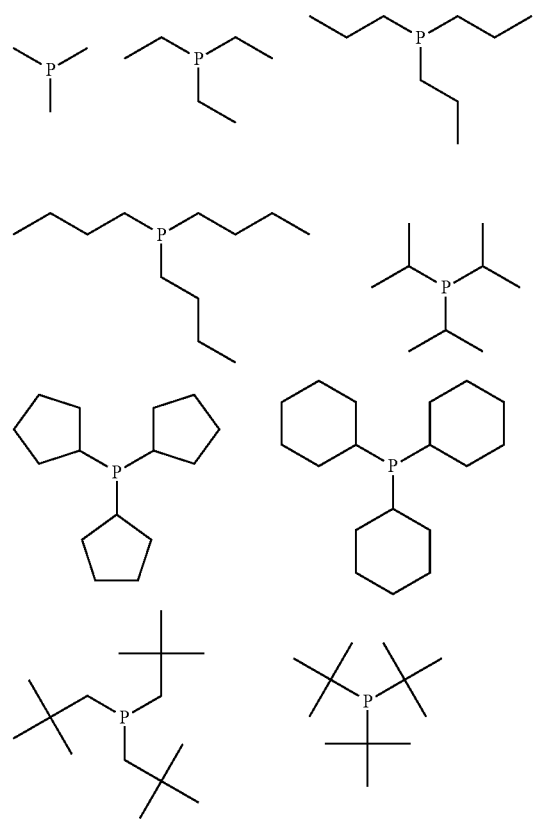

-continued
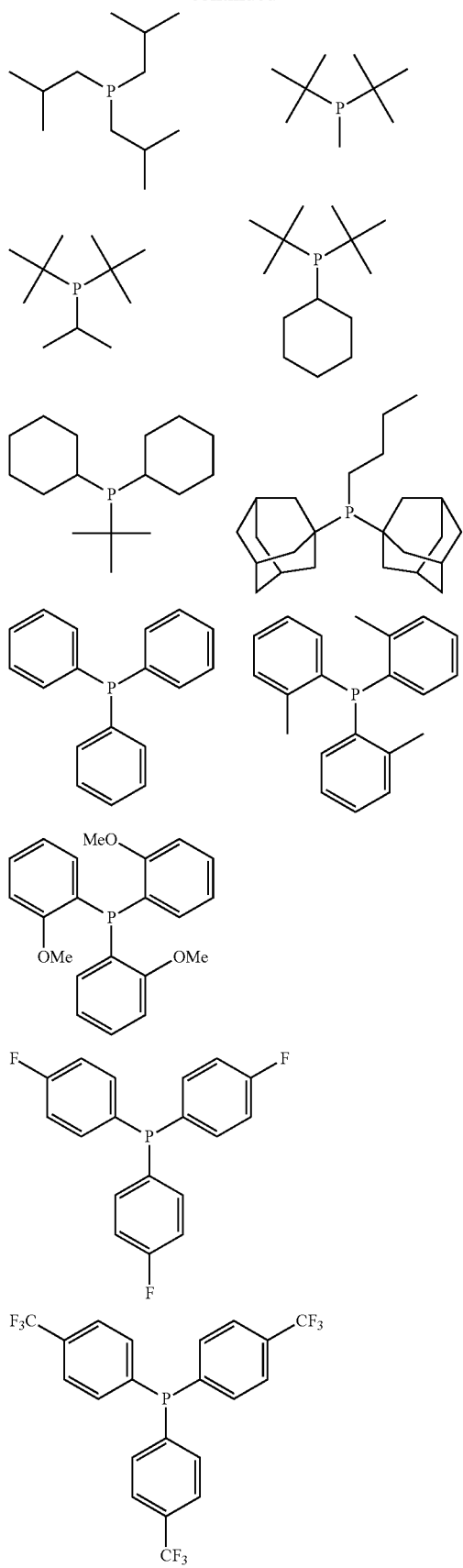
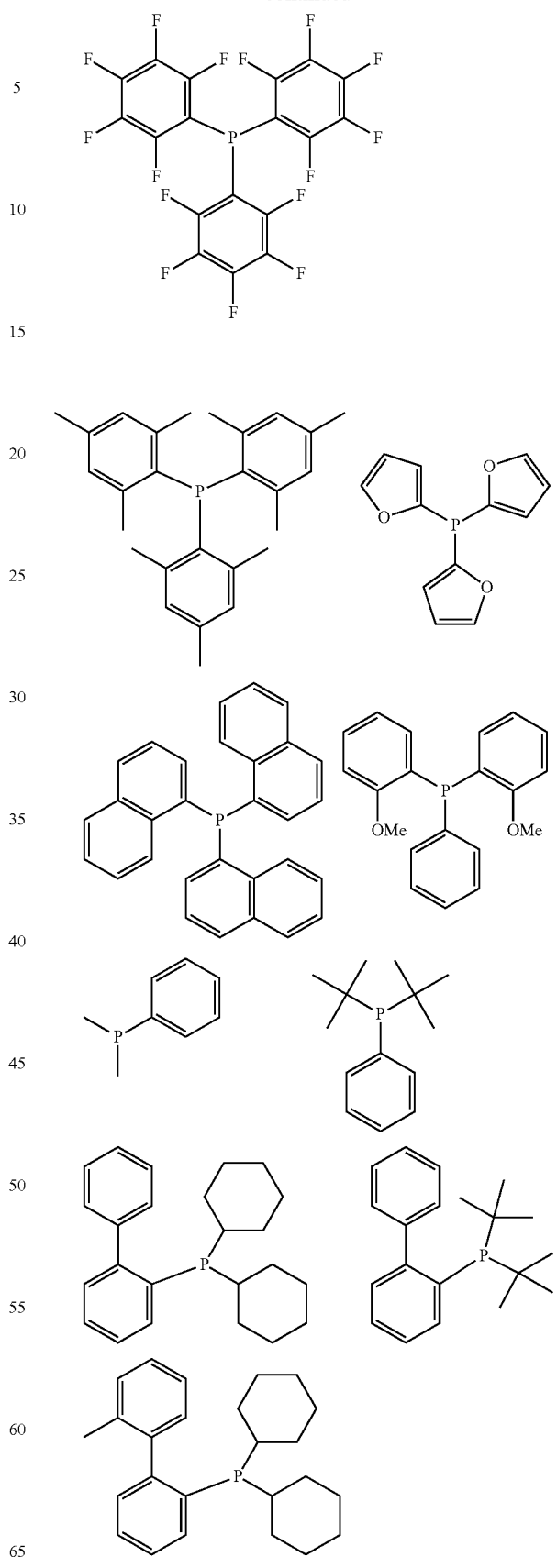

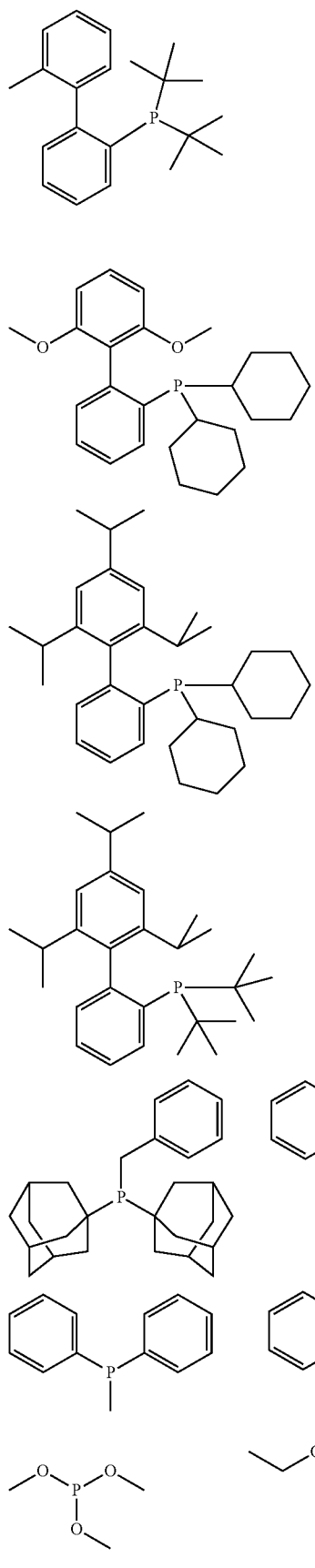

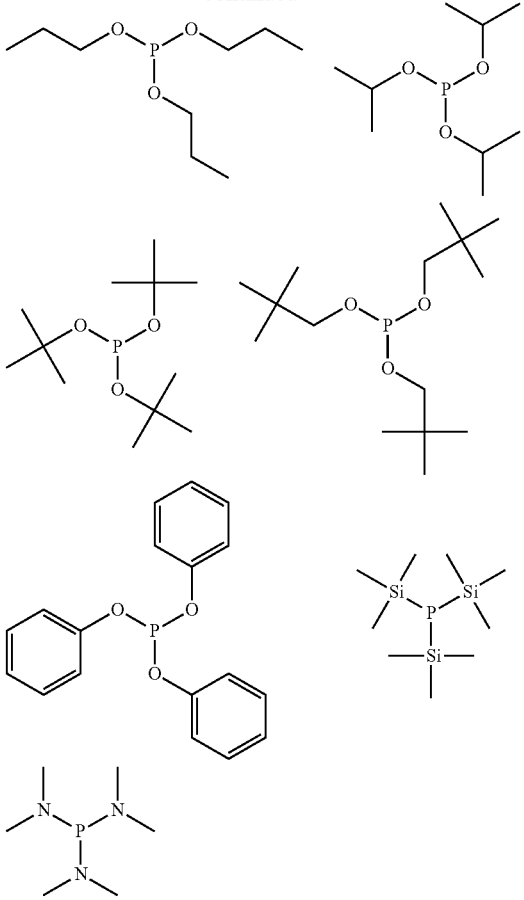

Specific examples of Y—X—R⁶/R⁷ moiety in which X is an arsenic (As) atom, that is,

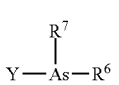

include the structures in the following formulae:

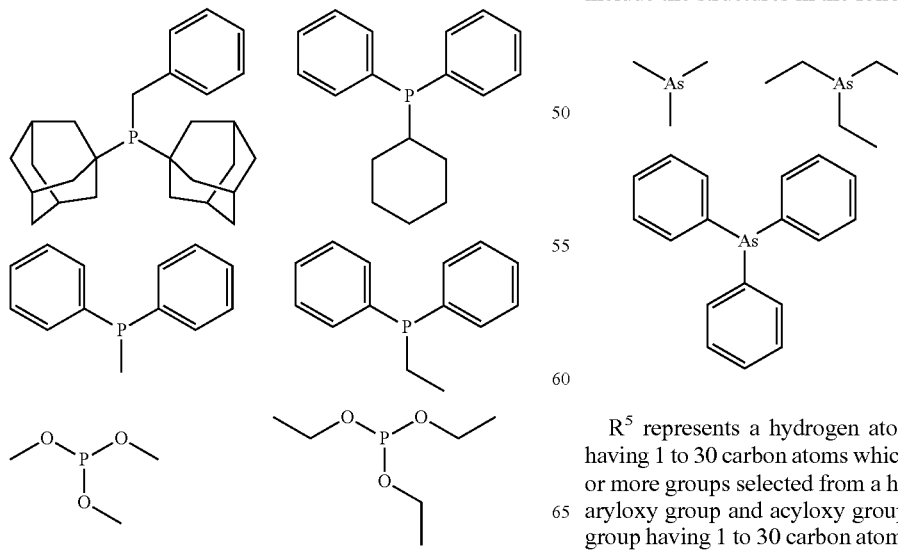

$R^5$ represents a hydrogen atom or a hydrocarbon group having 1 to 30 carbon atoms which may be substituted by one or more groups selected from a halogen atom, alkoxy group, aryloxy group and acyloxy group. A preferred hydrocarbon group having 1 to 30 carbon atoms which may be substituted by one or more groups selected from a halogen atom, alkoxy group and aryloxy group is alkyl group having 1 to 6 carbon atoms. A preferred halogen atom is chloride and bromide. Preferred alkoxy group is methoxy group and ethoxy group. Preferred aryloxy group is phenoxy group. Preferred acyloxy group is acetoxy group and pivaloxy group. Particularly preferable examples of $R^5$ include a hydrogen atom, methyl group, ethyl group, n-propyl group, isopropyl group, methoxymethyl group, phenoxy methyl group, 1-acetoxyphenyl group and 1-pivaloxypropyl group.

Q represents a bivalent group indicated by —S(=O)$_2$—O—, —C(=O)—O—, —P(=O)(—OH)—O— or —S—, which is a moiety, wherein one electron coordinates to M. The left side of each of the above-mentioned formulae bonds to Z while the right side bonds to M. Among these, —S(=O)$_2$—O— is particularly preferable from the viewpoint of the catalyst activity.

Z represents a hydrogen atom or a hydrocarbon group having 1 to 40 carbon atoms which may be substituted by one or more groups selected from a halogen atom, alkoxy group and aryloxy group. Y and Z may bond to each other to form a ring structure. Specific examples of the halogen atom, alkoxy group and aryloxy group in the "hydrocarbon atom having 1 to 40 carbon atoms which may be substituted by one or more groups selected from a halogen atom, alkoxy group and aryloxy group" include those mentioned as the examples in Y, $R^6$ and $R^7$. Examples of hydrocarbon atom having 1 to 40 carbon atoms include methyl group, ethyl group, isopropyl group, t-butyl group, isobutyl group, cyclohexyl group, cyclopentyl group, phenyl group, 2-i-propylphenyl group, and 2,6-di-i-propylphenyl group.

Z-Q moiety is an oxygen atom or a sulfur atom having high electronegativity and one electron of the oxygen or sulfur atom of Z-Q moiety coordinates to metal atom M. Since the bonding electron between Z-Q-M is transferred from M to Z-Q, Z-Q and M may be indicated formally as an anion state and a cation state, respectively.

In formula (C1), Y moiety and Z moiety may bond to each other. In this case, formula (C1) can be represented by formula (C2). In formula (C2), Y—Z moiety as a whole is indicated by $Y^1$. Here, $Y^1$ represents a cross-linked structure between Q and X.

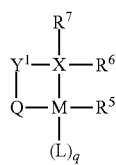
(C2)

In the formula, $Y^1$ represents a bivalent hydrocarbon group having 1 to 70 carbon atoms which may be substituted by one or more groups selected from a halogen atom, alkoxy group and aryloxy group. Q, M, X, $R^5$, $R^6$, $R^7$, L and q have the same meanings as in formula (C1).

Specific examples of a halogen atom, alkoxy group and aryloxy group as $Y^1$ are the same as those as Y. Examples of the hydrocarbon group having 1 to 70 carbon atoms include alkylene group and arylene group. Particularly preferred is arylene group.

Examples of [($R^6$)($R^7$)P] moiety when X is P (a phosphorous atom) include the following structures. In the following structure formulae, the bond between P and M or $Y^1$ is not shown.

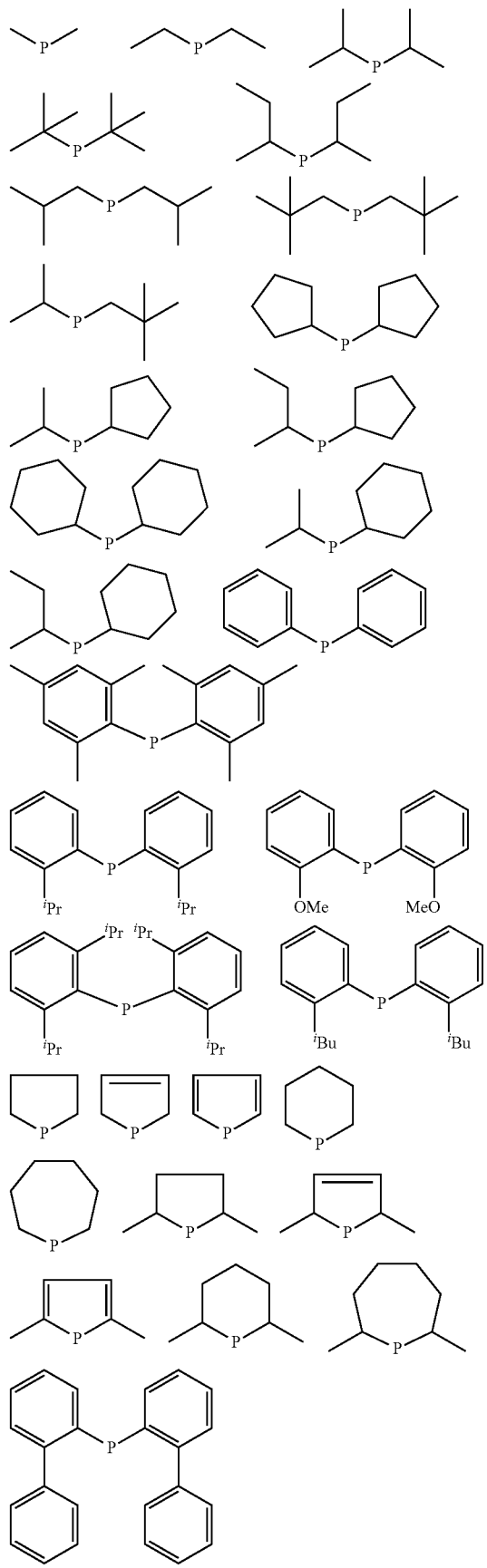

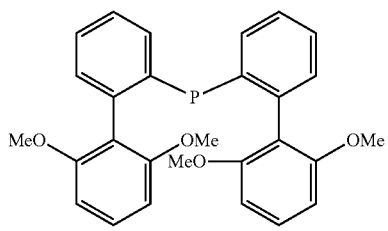

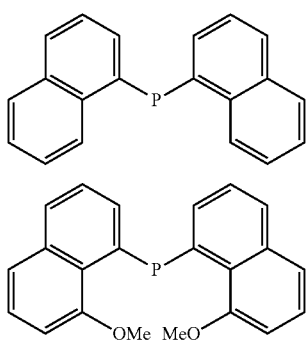

The cross-linked structure $Y^1$ is the crosslinking moiety which binds X and Q moiety. Specific examples of the cross-linked structure $Y^1$ in which X is represented by a P atom are shown below. Here, multiple $R^9$s may be the same or different to each other and represent a hydrogen atom, halogen atom, hydrocarbon group having 1 to 20 carbon atoms, or a hydrocarbon group having 1 to 20 carbon atoms substituted by a halogen atom.

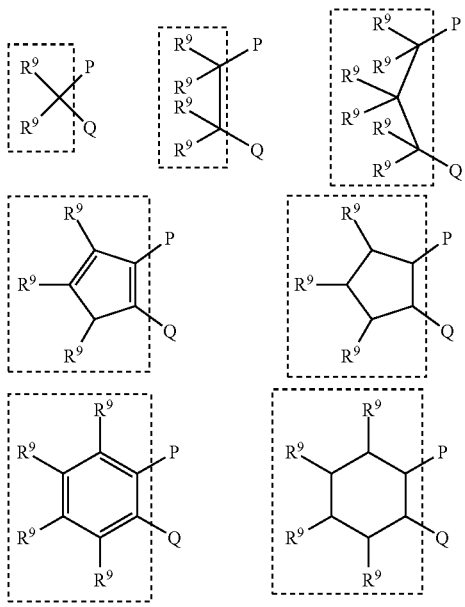

Substituents $R^6$ and $R^7$ may bond to $Y^1$ moiety to form a ring structure. Specific examples include the structures as follows:

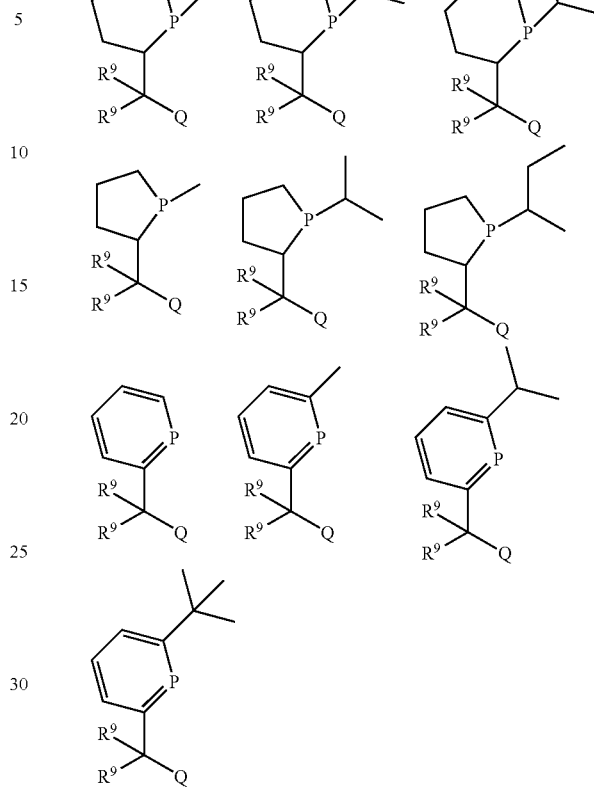

Among the catalysts represented by formula (C2), those represented by the following formula (C3) are particularly preferable.

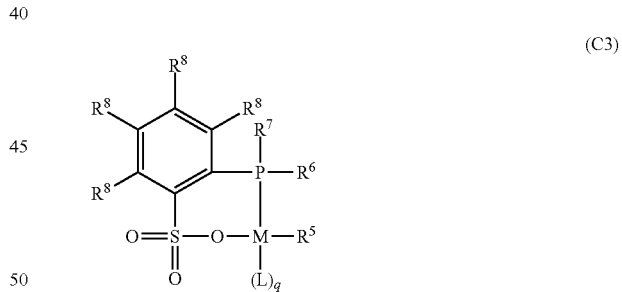

(C3)

In the formula, four $R^8$s independently represent a hydrogen atom, alkyl group having 1 to 8 carbon atoms, alkoxy group having 1 to 8 carbon atoms, aryloxy group having 6 to 18 carbon atoms or halogen atom; and M, $R^5$, $R^6$, $R^7$, L and q have the same meanings as those in formula (C1).

In formula (C3), preferred $R^5$ is an alkyl group having 1 to 6 carbon atoms, particularly methyl group. Both of $R^6$ and $R^7$ are preferably a cyclohexyl group, cyclopentyl group or isopropyl group. M is preferably Pd.

The metal complex of the catalysts represented by formulae (C1) and (C2) can be synthesized according to the known documents (for example, J. Am. Chem. Soc. 2007, 129, 8948). That is, a metal complex is synthesized by reacting zerovalent or bivalent M source with a ligand in formula (C1) or (C2).

The compound represented by formula (C3) can be synthesized by making $Y^1$ and Q in formula (C2) a specific group corresponding to formula (C3).

Examples of zerovalent M source include tris(dibenzylidene acetone)dipalladium as a palladium source and tetracarbonyl nickel(0) ($Ni(CO)_4$) and bis(1,5-cyclooctadiene) nickel as a nickel source.

Examples of bivalent M source include (1,5-cyclooctadiene)(methyl)palladium chloride, palladium chloride, palladium acetate, bis(acetonitrile)dichloropalladium ($PdCl_2$ ($CH_3CN)_2$), bis(benzonitrile)dichloropalladium ($PdCl_2$ ($PhCN)_2$), (N,N,N',N'-tetramethylethylenediamine)dichloro palladium(II) ($PdCl_2$ (TMEDA)), (N,N,N',N'-tetramethylethylenediamine)dimethyl palladium (II) ($PdMe_2$ (TMEDA)), palladium(II) acetylacetonate ($Pd(acac)_2$), palladium(II) trifluoromethanesulfonate ($Pd(OCOCF_3)_2$) as a palladium source and (allyl)nickel chloride, (allyl)nickel bromide, nickel chloride, nickel acetate, nickel(II) acetylacetonate (Ni $(acac)_2$), (1,2-dimethoxyethane)dichloronickel(II) ($NiCl_2$ (DME)) and nickel(II) trifluoromethanesulfonate (Ni $(OSO_2CF_3)_2$) as a nickel source.

While an isolated metal complex represented by formula (C1) or (C2) can be used, the metal complex generated by bringing a M-containing metal source and a ligand precursor in the reaction system can also be used for in-situ polymerization without isolating the metal complex. Particularly, when $R^5$ in formulae (C1) and (C2) is a hydrogen atom, it is preferable to use the metal complex generated in situ after reacting a metal source containing zerovalent M and a ligand precursor for polymerization without isolating the metal complex.

In this case, ligand precursors represented by formulae (C1-1) and (C1-2) can be used for a metal complex represented by formula (C1).

$$X—Y(R^6)(R^7) \quad (C1-1)$$

(Symbols in the formula have the same meanings as mentioned above.)

$$Z-Q-R^5 \quad (C1-2)$$

(Symbols in the formula have the same meanings as mentioned above.)

The ligand precursor represented by the following formula (C2-1) can be used for a metal complex represented by formula (C2).

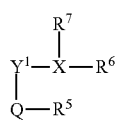

(C2-1)

(Symbols in the formula have the same meanings as mentioned above.)

In formula (C1), it is preferable to select the ratio between the M source (M) and a ligand precursor (C1-1) (X) or a ligand precursor (C1-2) (Z) (i.e. X/M or Z/M) or the ratio between the M source (M) and a ligand precursor (C2-1) (C2 ligand) (i.e. (C2 ligand)/M) within the range of from 0.5 to 2.0, more preferably from 1.0 to 1.5.

When isolating the metal complex of formula (C1) or (C2), the one stabilized by making an electron-donating ligand (L) coordinate to the metal complex in advance may be used. In this case, q is ½, 1 or 2. q of ½ means that a bivalent electron-donating ligand coordinates to two metal complexes. q is preferably ½ or 1 to stabilize a metal complex catalyst. q of 0 means that there is no ligand in the precursor.

An electron-donating ligand (L) is a compound which contains an electron-donating group and is capable of stabilizing a metal complex by coordinating to metal atom M.

As the electron-donating ligand (L), examples of those containing a sulfur atom include dimethyl sulfoxide (DMSO). Examples of those containing a nitrogen atom include trialkyl amine having 1 to 10 carbon atoms in alkyl group, dialkyl amine having 1 to 10 carbon atoms in alkyl group, pyridine, 2,6-dimethylpyridine (otherwise known as "lutidine"), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile and benzonitrile. Examples of those containing an oxygen atom include diethyl ether, tetrahydrofuran and 1,2-dimethoxyethane.

The metal complex represented by formula (C1) or (C2) may be supported on a support to be used for polymerization. In this case, there are no particular limitations on the support and examples include an inorganic support such as silica gel and alumina and an organic support such as polystyrene, polyethylene and polypropylene. Examples of the method for depositing a metal complex on a support include a physical adsorption method of impregnating the support with a solution of the metal complex and drying it and a method of depositing the metal complex onto a support by chemically bonding the metal complex to a support.

[Polymerization Method]

When the metal complex of the present invention is used as a catalyst, there are no particular limitations on the method of polymerizing monomers represented formulae (1) and (2) and the monomers can be polymerized by a widely-used method. That is, a process such as a solution polymerization method, a suspension polymerization method and a gas-phase polymerization method is available. Particularly preferred are a solution polymerization method and a suspension polymerization method.

A mixture of two or more of the metal complex catalysts represented by formula (C1), (C2) or (C3) may be used for the polymerization reaction. Using the catalysts in mixture enables controlling the molecular weight and molecular weight distribution of the polymer and the content of the monomer unit represented by formula (4) to thereby obtain a polymer suitable for the desired use. The molar ratio between the metal complex catalyst represented by formula (C1), (C2) or (C3) and the total amount of monomers (monomers/metal complex) is within the range of from 1 to 10,000,000, preferably the range of from 10 to 1,000,000, more preferably the range of from 100 to 100,000.

There are no particular limitations on the polymerization temperature. The polymerization is generally conducted at a temperature in the range of from −30 to 200° C., preferably in the range of from 0 to 180° C., more preferably in the range of from 20 to 150° C.

The polymerization is conducted at a polymerization pressure, wherein the internal pressure consists mostly of the pressure of olefin represented by formula (1), in the range from normal pressure to 20 MPa, preferably in the range from normal pressure to 10 MPa.

The polymerization time can be appropriately adjusted depending on the processing mode and the polymerization activity of the catalyst, and can be as short as several minutes or as long as several thousand hours.

It is preferable to fill the atmosphere in the polymerization system with an inert gas such as nitrogen and argon to prevent components other than monomers such as air, oxygen and moisture being mixed into the atmosphere to retain the catalyst activity. In the case of the solution polymerization, an inert solvent may be used in addition to monomers. There are no particular limitations on the inert solvent, and examples include aliphatic hydrocarbon such as isobutane, pentane, hexane, heptane and cyclohexane; aromatic hydrocarbon such as benzene, toluene and xylene; halogenated aliphatic hydrocarbon such as chloroform, methylene chloride, carbon tetrachloride, dichloroethane and tetrachloroethane; halogenated aromatic hydrocarbon such as chlorobenzene, dichlorobenzene and trichlorobenzene; aliphatic ester such as methyl acetate and ethyl acetate; and aromatic ester such as methyl benzoate and ethyl benzoate.

In addition to the compounds represented by formulae (1) and (2), one or more types of third polymer units may be introduced into the copolymer of the polar group-containing allyl monomers of the present invention to thereby add functions to the polymer. Examples of the third monomer include an olefin compound having 9 or more carbon atoms and polar group-containing monomer other than an allyl monomer. Examples of the olefin compound having 9 or more carbon atoms include 1-nonene and 1-decene. Examples of a polar group-containing monomer other than an allyl monomer include acrylic acid, acrylic acid ester, metacrylic acid, metacrylic acid ester and acrylonitrile.

The polymer of the present invention can be converted into various polymers using the reactivity of the functional group. For example, when $R^2$ is hydroxyl group, a graft polymer can be produced in which two or more polymers are bonded to each other by substituting a primary hydroxyl group by halogen as a starting point of living radical polymerization to polymerize various polar group-containing monomers by radical polymerization. Examples of radically polymerizable monomers in this case include acrylic acid ester, metacrylic acid ester, acrylonitrile, vinyl acetate and styrene.

The blending ratio of the monomers represented by formulae (1) and (2) is to be appropriately adjusted depending on the composition ratio of the targeted copolymer. This includes a case where a third monomer is used.

The monomer represented by formula (1) is in the form of gas at a polymerization reaction temperature, the pressure of which is to be controlled. The monomer represented by formula (2) can be used as it is or may be diluted with an inert solvent to adjust the monomer blending ratio.

After completion of the polymerization reaction, the copolymer as a reaction product is to be isolated by post-treatment using a known operation and treating method (e.g. neutralization, extraction with solvents, washing with water, liquid separation, distillation with solvents and reprecipitation).

The copolymer can be molded into the form of a pellet, film, sheet and the like under conditions for general thermoplastic resin.

The copolymer of allyl acetate with olefin such as ethylene can be converted to an allyl alcohol copolymer by saponification. When the copolymer is partially saponified, it becomes a tripolymer of ethylene, allyl alcohol and allyl acetate.

The obtained copolymer can be a product per se by molding such as injection molding, extrusion and film processing. Or the copolymer may be added to polyolefin and the like to be used as a modifier of the surface features such as adhesiveness and printing performance; a compatibility agent between nonpolar polyolefin and highly-polar other resins; and a dispersing agent of pigments and the like. The copolymer may also be used for purposes such as paint, ink, adhesive agent, binder, plasticizer, lubricant, lubricant oil and surface active agent.

[Copolymer of Polar Group-Containing Allyl Monomers]

The copolymer of polar group-containing allyl monomers of the present invention is obtained by polymerizing compounds represented by the above formulae (1) and (2) and a third monomer as needed in the presence of the above-mentioned catalyst. The copolymer of polar group-containing allyl monomers of the present invention is a copolymer containing monomer units represented by formulae (3-1) and (4)

(in formulae, $R^{1-1}$ represents a hydrogen atom or methyl group and $R^2$, n and m have the same meaning as mentioned above) and having structures as described in (A) and (B) below:

(A) The main chain has one or less branch, which has two or more carbon atoms, per 1000 carbon atoms which constitute the main chain.
(B) The main chain has a carbon-to-carbon double bond at least at one end of the main chain.

It is more preferable for the copolymer to satisfy the requirements as stated in (C), (D) and (E) below:

(C) The number average molecular weight in terms of polystyrene (Mn) is 1,000 or more and 1,000,000 or less
(D) The molecular weight distribution (Mw/Mn) is 1.0 or more and 3.0 or less
(E) The molar ratio of the monomer units represented by formulae (3-1) and (4) (n and m) satisfies the following formula:

$$0.1 \le \{m/(m+n)\} \times 100 \le 50$$

In formula (3-1), $R^{1-1}$ represents a hydrogen atom or methyl group, preferably a hydrogen atom. $R^2$, m and n have the same meanings as mentioned above.

In the present invention, a branch means the one having two or more carbon atoms and the side chain of the monomer is not to be counted as a branch.

As a polymer chain structure, a linear structure and a branched structure are generally known. It is known that a branched structure is obtained by back biting mechanism in ethylene-based polymers obtained by radical polymerization. In the branched structure, there exist short-chain branches having 5 or less carbon atoms and long-chain branches starting from the radical generated in the main chain, which are obtained by back biting. Meanwhile, the copolymer obtained by the catalyst system of the present invention has a linear structure containing very few long-chain branches. The copolymer of the present invention has a branch of one or less per 1000 carbon atoms which constitute the main chain. Here, the number of branches per 1000 carbon atoms can be calculated by measuring the number of tertiary carbon atoms in the main chain to which a branch having two or more carbon atoms are bonded by the $^{13}$C-NMR spectrum. The side chains of the monomer are not counted in the branches in the present invention. For example, when 1-butene is copolymerized as a third monomer, ethyl group becomes a side chain and shall not be counted as a branch.

linear    branched

The terminal structure of the polymer of the present invention is different from that of the main chain. One may grasp the terminal structure divided between the initiation end which arises at the initiation of polymerization and the terminal end which arises at the termination of polymerization. Since the initiation end is formed by inserting olefin in the bond between metal and a hydrogen atom or between metal and alkyl group, the end has a saturated bond structure. The terminal end structures are divided into a saturated bond and an unsaturated bond depending on the reaction mechanism. When a chain transfer agent containing alkyl group such as organic aluminum is used in the reaction system, the molecular chain transfers to aluminum atoms, which terminates the polymerization reaction and makes a terminal structure have a saturated bond. When a titanium trichloride-based Ziegler-Natta catalyst and a metal complex of group 4 elements are used as a catalyst, organic aluminum is used to copolymerize a polar-group containing allyl compound, which makes a terminal structure have a saturated bond. On the other hand, since organic aluminum is not used in the present invention, polymer chain growth terminates by β-hydrogen elimination, which makes at least one of the terminal structures has an unsaturated double bond.

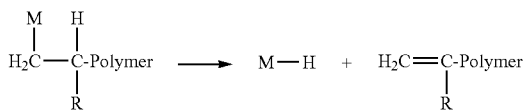

In the formula, R means $R^1$ or $CH_2R^2$ in formula (1) or (2) and "Polymer" means a polymer chain.

An unsaturated double bond can be confirmed by analyzing the NMR spectrum of the copolymer. The terminal unsaturated bond is highly reactive and enables modification of functional groups, block copolymerization and production of star polymers. Therefore, the copolymer of the present invention is very useful.

Copolymers of the polar group-containing allyl monomers having a number average molecular weight of 3,000 or more and 1,000,000 or less in terms of polystyrene can be obtained according to the method for producing copolymers of the polar group-containing allyl monomers of the present invention. Such copolymers can be used in various molding methods.

Also, the method enables obtaining the copolymer with molecular distribution (Mw/Mn) as narrow as 1.0 or more and 3.0 or less. The narrow molecular distribution contributes to cutting back a low-molecular-weight or high-molecular-weight content, which generally has a positive effect on physical properties of the polymer and facilitates controlling the molecular distribution to achieve property balance as well.

The content of the monomer unit represented by formula (4) (mol %={m/(m+n)}×100) is preferably 0.1% or more and 50% or less. The content of the monomer unit represented by formula (4) is preferably 0.5 to 15.0 mol %, more preferably 1.0 to 6.0 mol % from the viewpoint of having a similar melt viscosity and molding conditions to those of polyethylene. When there are multiple monomer units represented by formula (4), m should be the total of each of the monomer units. As mentioned above, a third monomer unit other than monomer units represented by formulae (3-1) and (4) may be copolymerized.

In the copolymer of the present invention, a part or all of the monomer unit represented by formula (4) may be saponified. When the monomer unit represented by formula (4) is derived from allyl acetate, the copolymer after saponification has a structure as follows. The monomer unit of formula (4-2) derived from allyl acetate is saponified and changes to the monomer unit derived from allyl alcohol represented by formula (4-1). $m_1+m_2=m$. When all of the monomer unit represented by are saponified, $m_1$ becomes 0. The ratio between $m_1$ and $m_2$ can be adjusted by the degree of saponification. The saponification of the copolymer is conducted by a known method similar to that of saponifying poly(vinyl acetate).

The copolymer can be dissolved or dispersed in a solvent and treated with acid and alkali in the presence of water and alcohol.

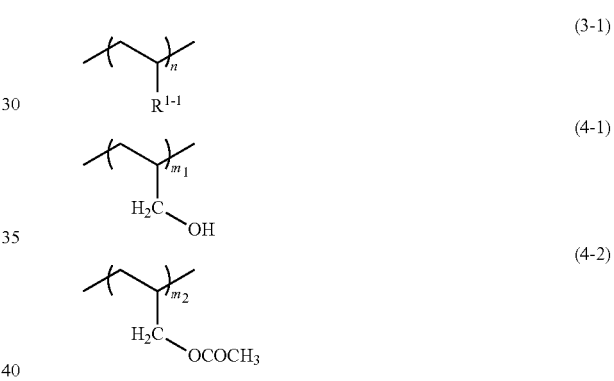

(In the formula, $R^{1-1}$ has the same meaning as mentioned above and n, $m_1$ and $m_2$ are the values to indicate the molar ratio between each of the monomer units.)

The copolymer of N-t-butoxycarbonyl-N-allylamine and ethylene and the like can be converted to a copolymer of allylamine or allyl ammonium salts by hydrolysis under an acidic condition. When the copolymer is partially saponified, it becomes a tripolymer of ethylene, allylamine and N-t-butoxycarbonyl-N-allylamine.

EXAMPLES

Hereinafter, the present invention is described in greater detail by referring to Examples and Comparative Examples. The present invention is by no means limited thereto.

[Method for Analyzing the Polymer Structure]

The structure of the copolymers obtained in Examples was determined by various analysis of the NMR spectra using JNM-ECS400 manufactured by JEOL Ltd. The content of the monomer unit derived from the allyl compound represented by formula (2) and the terminal structure of the copolymer was determined by analyzing $^{13}C$-NMR spectrum (90° pulse at 9.0 microseconds, spectrum width: 31 kHz, relaxation time: 10 seconds, acquisition time: 10 seconds, times of accumulating FID signals: 5,000 to 10,000 times) through the inverse-gated decoupling method at 120° C. using 1,2,4-trichlorobenzene (0.55 ml) as a solvent and Cr(acac)₃ (10 mg) as relaxation agent.

Figure 3:
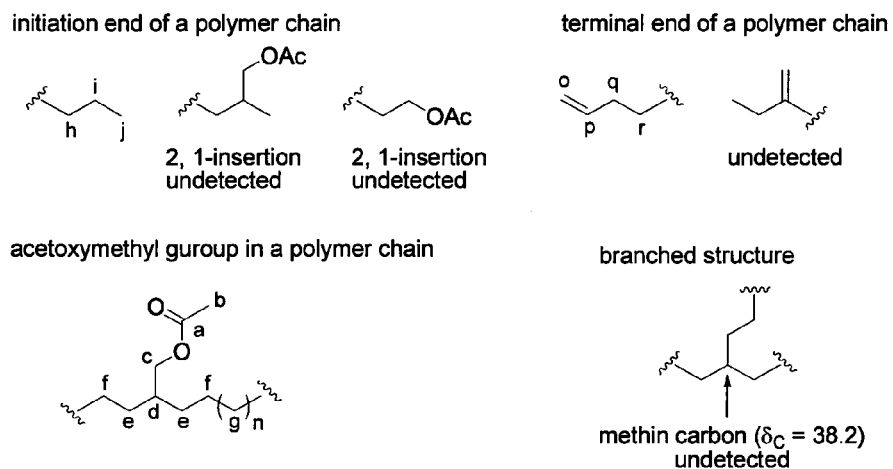
FIG. 3 A figure showing a terminal structure, a chemical shift of the $^{13}$C-NMR spectrum, and the carbon identification in the alphabet in the polymer analysis of Example 1

A branched structure can be determined by analyzing ¹³C-NMR spectrum of the tertiary carbon atom. That is, while the chemical shift value of the carbon atom in the branch of allyl acetate (corresponding to carbon atom d in FIG. 3) appears at 37.9 ppm, the chemical shift value of the tertiary carbon atom (carbon atom at the branch point) appears in the vicinity of 38.2 to 39 ppm when there is a branch in the polymer main chain, thereby permitting the distinction between the two (see FIG. 3) (Reference document: Macromolecules 1999, 32, 1620-1625).

Similarly, a terminal structure can be analyzed by ¹³C-NMR or ¹H-NMR spectrum. Particularly, when the copolymer contains a terminal double bond, peaks appears at 114 ppm and 139 ppm in ¹³C-NMR spectrum, which can be differentiated from the peak attributed to a saturated terminal structure that appears in the range of 10 to 40 ppm (Reference document: Chem. Commun. 2002, 744-745).

A number average molecular weight and a weight average molecular weight were calculated by size extrusion chromatography in which polystyrene is employed as an internal standard substance using a high-temperature GPC apparatus, HLC-8121GPC/HT, manufactured by Tosoh Corporation, provided with TSKgel GMHHR-H(S) HT column (two columns of 7.8 mm I.D.×30 cm arranged in series) manufactured by Tosoh Corporation (solvent: 1,2-dichlorobenzene, temperature: 145° C.).

[Synthesis of Metal Complex Catalyst 1]

Metal complex catalyst 1 was synthesized according to the following reaction scheme:

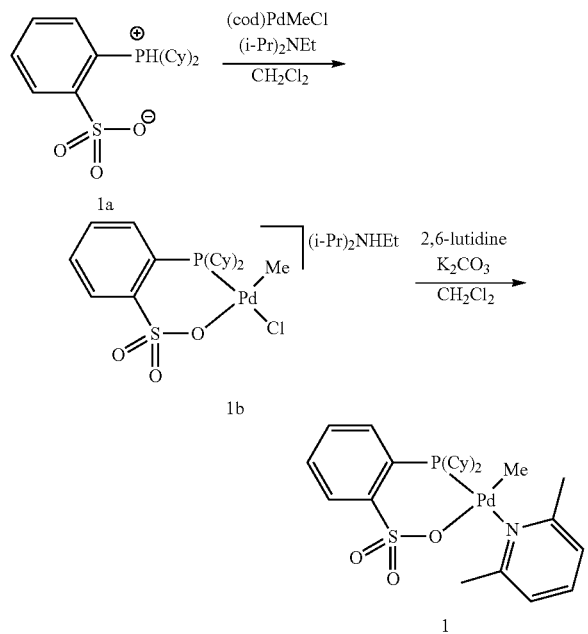

Cy = cyclohexyl (a) Synthesis of Compound 1a n-butyllithium (manufactured by Kanto Chemical Co., Inc., 1.65 M hexane solution, 5.1 ml, 8.4 mmol) was added to a tetrahydrofuran (THF) solution (20 ml) of benzenesulfonic acid (manufactured by Tokyo Chemical Industry Co., Ltd., 662 mg, 4.2 mmol) at 0° C. under argon atmosphere and the mixture was stirred for 2.5 hours at room temperature. After cooling the reaction container to −78° C., chlorodicyclohexylphosphine (manufactured by Sigma-Aldrich, 885 mg, 3.8 mmol) was added thereto at −78° C. and stirred for 24 hours at room temperature. After ceasing the reaction by trifluoroacetic acid (manufactured by Tokyo Chemical Industry Co., Ltd., 0.5 M THF solution, 8.4 ml, 4.2 mmol), the generated precipitate was recovered by filtration and dried under reduced pressure to obtain phosphonium sulfonate (compound 1a). The yield was 656 mg (85%).

¹H-NMR (400 MHz, CDCl₃): δ 0.98-0.27 (m, 4H), 1.30-1.58 (m, 6H), 1.62-1.78 (m, 4H), 1.88 (br s, 4H), 2.28 (br s, 2H), 3.33 (br s, 2H), 5.19 (br d, ¹$J_{PH}$=370 Hz, 1H), 7.48-7.58 (m, 2H), 7.80 (br s, 1H), 8.27 (br s, 1H);

¹³C-NMR (101 MHz, CDCl₃): δ 25.0 (s), 25.6-26.2 (m), 28.8 (br), 30.3 (br), 34.6 (br d, ¹$J_{PC}$=40 Hz), 113.4 (br d, ¹$J_{PC}$=87 Hz), 128.8 (d, ¹$J_{PC}$=9 Hz), 130.1 (d, ¹$J_{PC}$=9 Hz), 135.4 (br), 137.1 (br), 150.5 (br);

³¹P-NMR (162 MHz, CDCl₃): δ 52.8 (d, ¹$J_{PH}$=370 Hz) (90%), 20.8 (d, ¹$J_{PH}$=530 Hz) (10%);

Anal. calcd for C₁₈H₂₇O₃PS, C, 60.99; H, 7.68.
found: C, 60.90; H, 7.55.

(b) Synthesis of Complex 1b

A methylene chloride solution (6 ml) of (COD)PdMeCl (synthesized according to "Chem., 1993, 32, 5769-5778; COD: 1,5-cyclooctadiene; 321 mg; 1.2 mmol) was added to a methylene chloride solution (16 ml) of 2-(dicyclohexylphosphino)benzenesulfonic acid; compound 1a) (426 mg, 1.2 mmol) and diisopropylethyl amine (manufactured by Wako Chemical Pure Chemical Industries Ltd.; 1.1 ml, 6.0 mmol) under argon atmosphere and the mixture was stirred for one hour at room temperature. After condensing the solvent, the precipitation was removed by filtration and the solvent was added to hexane. The generated precipitate was recovered by filtration, washed with hexane and then dried under reduced pressure to obtain complex 1b. The yield was 656 mg (85%).

¹H-NMR (500 MHz, CDCl₃): δ 0.71 (d, ³$J_{PH}$=1.4 Hz, 3H, PdCH₃), 1.11-1.35 (m, 8H), 1.45 (d, J=6.6 Hz, 6H, HNCH (CH₃)₂), 1.57 (d, J=6.6 Hz, 6H, HNCH(CH₃)₂), 1.57 (t, J=7.3 Hz, 3H, HNCH₂CH₃), 1.60-1.70 (m, 6H), 1.72-1.84 (m, 4H), 2.12-2.28 (m, 4H), 3.29 (dq, J=7.3, 5.0 Hz, 2H, HNCH₂CH₃), 3.92-4.01 (m, 2H, HNCH(CH₃)₂), 7.45 (dd, J=7.2, 7.2 Hz, 1H), 7.49 (dd, J=7.6, 7.6 Hz, 1H), 7.59 (dd, J=7.3, 7.3 Hz, 1H), 8.21 (ddd, J=7.7, 3.6, 1.3 Hz, 1H), 8.87 (br, 1H, NH);

¹³C-NMR (101 MHz, CDCl₃): δ −7.3 (s, PdCH₃), 12.0 (s, HNCH₂CH₃), 17.9 (s, HNCH(CH₃)₂), 19.2 (s, HNCH (CH₃)₂), 26.0 (s), 26.9-27.4 (m), 28.7 (s), 29.4 (d, ¹$J_{PC}$=4 Hz), 35.6 (d, ¹$J_{PC}$=25 Hz), 42.4 (s, HNCH₂CH₃), 54.6 (s, HNCH (CH₃)₂), 125.5 (d, ¹$J_{PC}$=33 Hz), 128.3 (d, ¹$J_{PC}$=7 Hz), 128.9 (d, ¹$J_{PC}$=6 Hz), 130.3 (s), 132.5 (s), 150.9 (d, ²$J_{PC}$=11 Hz);

³¹P-NMR (162 MHz, CDCl₃): δ 31.7;

Anal. calcd for C₂₇H₄₉ClNO₃PPdS, C, 50.62; H, 7.71; N, 2.19.
found: C, 50.49; H, 8.00; N, 2.12

(c) Synthesis of Metal Complex Catalyst 1

A methylene chloride solution (4 ml) of complex 1b (194 mg, 0.30 mmol) was added to a methylene chloride suspension (2 ml) of potassium carbonate (420 mg, 3.03 mmol) and 2,6-lutidine (manufactured by Tokyo Chemical Industry Co., Ltd., 333 mg, 3.11 mmol) under argon atmosphere and stirred for one hour at room temperature. Solid remained after distilling away the solvent under reduced pressure was washed with diethyl ether and extracted with a methylene chloride solution. The extract was filtered through by Celite (dry diatom earth) and slowly added to hexane (40 ml). The generated precipitate was recovered by filtration, washed with hexane and then dried under reduced pressure to obtain metal complex catalyst 1. The yield was 123 mg (70%).

$^1$H-NMR (400 MHz, CDCl$_3$): δ 0.32 (d, $^3J_{PH}$=2.3 Hz, 3H, PdCH$_3$), 1.12-1.47 (m, 8H), 1.60-1.94 (m, 10H), 2.22-2.33 (m, 4H), 3.18 (s, 6H, CH$_3$ of lutidine), 7.12 (d, J=7.7 Hz, 2H), 7.47 (dd, J=7.6, 7.6 Hz, 1H), 7.52 (dddd, J=7.6, 7.6, 1.4, 1.4 Hz, 1H), 7.58 (dd, J=8.1, 8.1 Hz, 1H), 7.60 (dd, J=7.5, 7.5 Hz, 1H), 8.29 (ddd, 7.8, 3.9, 1.5 Hz, 1H);

$^{13}$C-NMR (101 MHz, CDCl$_3$): δ −9.4 (d, $^2J_{PC}$=4.8 Hz, PdCH$_3$), 26.3 (s, CH$_3$ of lutidine), 26.9-27.5 (m), 28.6 (s), 29.6 (d, $^1J_{PC}$=3 Hz), 35.5 (d, $^1J_{PC}$=26 Hz), 122.5 (s), 122.5 (s), 124.6 (d, $^1J_{PC}$=35 Hz), 128.9 (d, $^1J_{PC}$=7 Hz), 129.0 (d, $^1J_{PC}$=6 Hz), 130.7 (s), 132.4 (s), 138.1 (s). 151.0 (d, $^2J_{PC}$=12 Hz), 159.0 (s);

$^{31}$P-NMR (162 MHz, CDCl$_3$): δ 27.5;

Anal. calcd for C$_{26}$H$_{38}$NO$_3$PPdS, C, 53.65; H, 6.58; N, 2.51.

found: C, 53.51; H, 6.74; N, 2.40

Example 1

Copolymerization of Allyl Acetate and Ethylene (Preparation of Copolymer 1)

Figure 4:
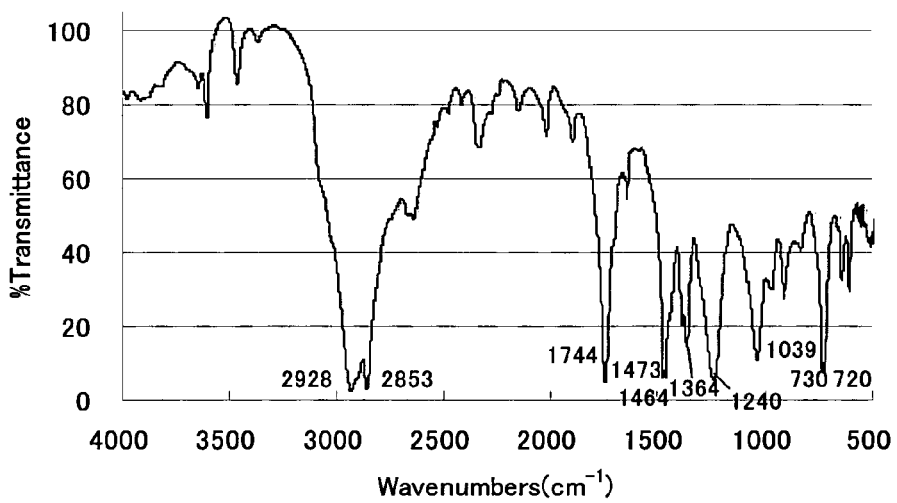
FIG. 4 The IR spectrum of the ethylene/allyl acetate copolymer obtained in Example 1

Methylene chloride (3.75 ml), toluene (3.75 ml) and allyl acetate (7.5 ml, 7.0 g, 70 mmol) were added to a 50 ml-volume autoclave containing metal complex catalyst 1 (58.2 g, 0.10 mmol) under argon atmosphere. After filling the autoclave with ethylene (3.0 MPa), the content of the autoclave was stirred at 80° C. for three hours. After cooling the autoclave to room temperature, methanol (about 20 ml) was added thereto. The generated copolymer was recovered by filtration, washed with methanol and dried under reduced pressure to obtain copolymer 1. The yield was 754 mg. The number average molecular weight and weight average molecular weight of the copolymer were calculated 8,100 and 16,200, respectively, by size exclusion chromatography and Mw/Mn was 2.0. The allyl acetate content in the copolymer was determined 100:3.4 by molar ratio of ethylene to allyl acetate (molar fraction of allyl acetate=3.3%) by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. From the detection limit in this case, the copolymer was found to be a linear polymer having one or less branch per 1000 carbon atoms. Also, $^{13}$C-NMR signal was observed at 114 ppm and 139 ppm, which was derived from a terminal double bond, and the copolymer was confirmed to be a polymer containing a terminal double bond. In addition, in the IR spectrum shown in FIG. 4, a peak derived from a carbonyl group was observed at 1744 cm$^{-1}$.

The polymerization conditions and results are shown in Tables 1 and 2.

Here, the productivity and the catalyst activity were calculated by the following formulae.

Productivity (g/mmol)=Yield of the obtained copolymer (g)/Molar number of the used metal complex catalyst (mmol)

Catalyst activity (g/mmol·h)=Yield of the obtained copolymer (g)/(Molar number of the used metal complex catalyst (mmol)×reaction time (h))

Example 2

Copolymerization of Allyl Acetate and Ethylene (Preparation of Copolymer 2)

Toluene (7.5 ml) and allyl acetate (7.5 ml, 7.0 g, 70 mmol) were added to a 50 ml-volume autoclave containing metal complex catalyst 1 (58.2 g, 0.10 mmol) under argon atmosphere. After filling the autoclave with ethylene (3.0 MPa), the content of the autoclave was stirred at 80° C. for three hours. After cooling the autoclave to room temperature, methanol (about 20 ml) was added thereto. The generated copolymer was recovered by filtration, washed with methanol and dried under reduced pressure to obtain copolymer 2. The yield was 585 mg. The number average molecular weight and weight average molecular weight of the copolymer were calculated 7,900 and 15,500, respectively, by size exclusion chromatography and Mw/Mn was 2.0. The allyl acetate content in the copolymer was determined 100:4.4 by molar ratio of ethylene to allyl acetate (molar fraction of allyl acetate=4.2%) by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. The polymerization conditions and results are shown in Tables 1 and 2.

Example 3

Copolymerization of Allyl Acetate and Ethylene (Preparation of Copolymer 3)

Metal complex catalyst 2 was synthesized in the same way as in metal complex catalyst 1 using 2-(dicyclopentylphosphino)benzenesulfonic acid as a starting material.

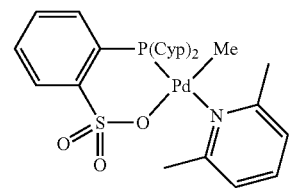

Cyp = cyclopentyl

Using the obtained metal complex catalyst 2, the copolymerization of allyl acetate and ethylene was conducted in the same way as in Example 2. That is, toluene (7.5 ml) and allyl acetate (7.5 ml, 7.0 g, 70 mmol) were added to a 50 ml-volume autoclave containing metal complex catalyst 2 (0.10 mmol) under argon atmosphere. After filling the autoclave with ethylene (3.0 MPa), the content of the autoclave was stirred at 80° C. for three hours. After cooling the autoclave to room temperature, methanol (about 20 ml) was added thereto. The generated copolymer was recovered by filtration, washed with methanol and dried under reduced pressure to obtain copolymer 3. The yield was 226 mg. The number average molecular weight and weight average molecular weight of the copolymer were calculated 3,400 and 5,400, respectively, by size exclusion chromatography and Mw/Mn was 1.6. The allyl acetate content in the copolymer was determined 100: 2.0 by molar ratio of ethylene to allyl acetate (molar fraction of allyl acetate=2.0%) by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. The polymerization conditions and results are shown in Tables 1 and 2.

Example 4

Copolymerization of Allyl Acetate and Ethylene (Preparation of Copolymer 4)

Metal complex catalyst 3 was synthesized in the same way as in metal complex catalyst 1 using 2-(diisopropylphosphino)benzenesulfonic acid as a starting material.

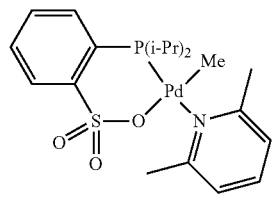

3 i-Pr = isopropyl

Using the metal complex catalyst 3, copolymerization of allyl acetate and ethylene was conducted in the same way as in Example 2. That is, toluene (7.5 ml) and allyl acetate (7.5 ml, 7.0 g, 70 mmol) were added to a 50 ml-volume autoclave containing metal complex catalyst 3 (0.10 mmol) under argon atmosphere. After filling the autoclave with ethylene (3.0 MPa), the content of the autoclave was stirred at 80° C. for three hours. After cooling the autoclave to room temperature, methanol (about 20 ml) was added thereto. The generated copolymer was recovered by filtration, washed with methanol and dried under reduced pressure to obtain copolymer 4. The yield was 525 mg. The number average molecular weight and weight average molecular weight of the copolymer were calculated 6,700 and 12,700, respectively, by size exclusion chromatography and Mw/Mn was 1.9. The allyl acetate content in the copolymer was determined 100:2.7 by molar ratio of ethylene to allyl acetate (molar fraction of allyl acetate=2.0%) by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. The polymerization conditions and results are shown in Tables 1 and 2.

Comparative Example 1

Copolymerization of Allyl Acetate and Ethylene by Radical Polymerization

Copolymerization of allyl acetate and ethylene was conducted using a radical generator AIBN (2,2-azobisisobutylonitrile) in place of a metal complex catalyst. That is, AIBN (0.742 g, 4.52 mmol) and allyl acetate (80 ml, 74.6 g, 747 mmol) were placed into a 120 ml-volume autoclave. After filling the autoclave with ethylene so that the pressure becomes 1.0 MPa, the content of the autoclave was stirred at 90° C. for two hours. Regarding the ethylene pressure during the reaction, after a decrease in pressure owing to the ethylene amount dissolved in a solvent (for about ten minutes after starting applying the ethylene pressure), no more decrease in the ethylene pressure due to the reaction was observed.

After cooling the autoclave to room temperature, the obtained solution was distilled under reduced pressure to distill away unreacted ally acetate to obtain 7.3 g of an oily substance. By the analysis of $^1$H-NMR and $^{13}$C-NMR of the obtained oily substance, it was found to be an oligomer in which only allyl acetate was reacted (molar fraction of allyl acetate=100.0%) and no ethylene skeleton by ethylene copolymerization exists. The number average molecular weight and weight average molecular weight of the copolymer were calculated 1,600 and 2,800, respectively, by size exclusion chromatography and Mw/Mn was 1.9. The polymerization conditions and results are shown in Tables 1 and 2.

[Synthesis of Metal Complex Catalyst 4]

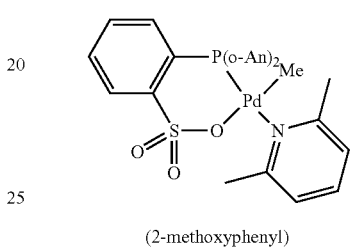

4

(2-methoxyphenyl)
o-An = o-anisyl

A methylene chloride solution of 2-[bis(2-methoxyphenyl)phosphino]benzenesulfonic acid (0.46 g, 1.1 mmol) and (TMEDA)PdMe$_2$ (synthesized according o "Organometallics" 1989, 8, 2907-2917; TMEDA=N,N,N'N'-tetramethyl-ethylenediamine, 0.29 g, 1.1 mmol) (7 ml) was stirred under nitrogen atmosphere at room temperature for 0.5 hour. Subsequently, 2,6-lutidine (1.2 g, 11.4 mmol) was added to the reaction solution and further stirred for three hours. After condensing the solution, the precipitate was removed by the filtration using a syringe filter, and the solution was added dropwise to hexane. The generated precipitate was recovered by filtration, washed with t-butylmethyl ether and hexane, and dried under reduced pressure to obtain metal complex catalyst 4.

The yield was 0.46 g (64%).

$^1$H-NMR (400 MHz, CDCl$_3$): δ −0.06 (d, $^3$J$_{PH}$=1.2 Hz, 3H, PdCH$_3$), 3.15 (s, 6H, CH$_3$ of lutidine), 3.61 (s, 6H, OCH$_3$), 6.90-6.93 (m, 2H), 7.03-7.11 (m, 4H), 7.32-7.57 (m, 6H), 7.77 (br s, 2H), 8.16 (br s, 1H)

[Synthesis of Metal Complex Catalyst 5]

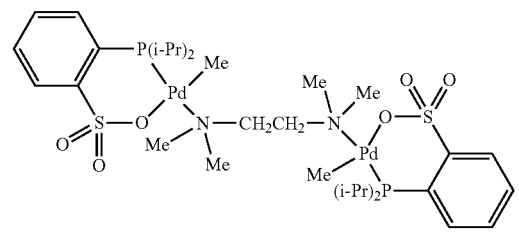

5

A methylene chloride solution of 2-(diisopropylphosphino)benzenesulfonic acid (0.96 g, 3.5 mmol) and (TMEDA)PdMe$_2$ (0.88 g, 1.1 mmol) (30 ml) was stirred under nitrogen atmosphere at room temperature for 1.5 hours.

After condensing the solution, the precipitate was removed by the filtration using a syringe filter, and the solution was added dropwise to hexane. The generated precipitate was recovered by filtration, washed with t-butylmethyl ether and hexane, and dried under reduced pressure to obtain metal complex catalyst 5. The yield was 1.6 g (98%).

¹H-NMR (400 MHz, CDCl₃): δ 0.39 (s, 6H, PdCH₃), 1.23 (br, 24H, P[CH(CH₃)₂]₂), 2.57 (br, 2H, PC[H(CH₃)₂]₂), 2.64 (s, 12H, (CH₃)₂NCH₂CH₂N(CH₃)₂), 3.48 (s, 4H, (CH₃)₂NCH₂CH₂N(CH₃)₂), 7.48-7.55 (m, 6H), 8.29 (br, 2H)

[Synthesis of Metal Complex Catalyst 6]

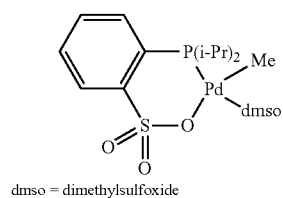

6 dmso = dimethylsulfoxide

A dimethyl sulfoxide (dmso) solution of metal complex catalyst 5 (0.48 g, 0.53 mmol) (10 ml) was stirred under nitrogen atmosphere and reduced pressure at 40° C. for ten hours. After adding methylene chloride (30 ml) and water (30 ml) to the reaction solution, an organic layer and a water layer were separated using a separating funnel. After drying the organic layer with magnesium sulfate, the solvent was distilled away with an evaporator. Methylene chloride (10 ml) was added to the residue to dissolve it, and the obtained solution was added dropwise to hexane (50 ml). The generated precipitate was recovered by filtration, washed with t-butylmethyl ether and hexane, and dried under reduced pressure to obtain metal complex catalyst 6. The yield was 0.26 (52%).

¹H-NMR (400 MHz, CDCl₃): δ 0.68 (s, 3H, PdCH₃), 1.21-1.32 (m, 12H, P[CH(CH₃)₂]₂), 2.49-2.58 (m, 2H, P[CH(CH₃)₂]₂), 2.88 (s, 6H, CH₃(S=O)CH₃), 7.47-7.58 (m, 3H), 8.31-8.33 (m, 1H)

[Synthesis of Metal Complex Catalyst 7]

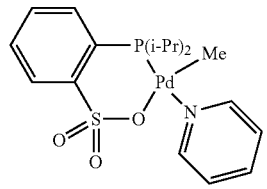

7

A methylene chloride solution of 2-(diisopropylphosphino)benzenesulfonic acid (0.33 g, 1.2 mmol) and (TMEDA)PdMe₂ (0.30 g, 1.2 mmol) (10 ml) was stirred under nitrogen atmosphere at room temperature for 0.5 hour. Pyridine (manufactured by Wako Pure Chemical Industries, Ltd., 0.48 g, 6.0 mmol) was added to the reaction solution and stirred for another one hour. After condensing the solution, the precipitate was removed by the filtration using a syringe filter, and the solution was added dropwise to hexane. The generated precipitate was recovered by filtration, washed with t-butylmethyl ether and hexane, and dried under reduced pressure to obtain metal complex catalyst 7. The yield was 0.39 g (68%).

¹H-NMR (400 MHz, CDCl₃): δ 0.57 (s, 3H, PdCH₃), 1.19-1.35 (m, 12H, P[CH(CH₃)₂]₂), 2.52-2.61 (m, 2H, P[CH(CH₃)₂]₂), 7.47-7.59 (m, 5H), 7.82-7.87 (m, 1H), 8.35 (br, 1H), 8.87 (br, 2H)

[Synthesis of Metal Complex Catalyst 8]

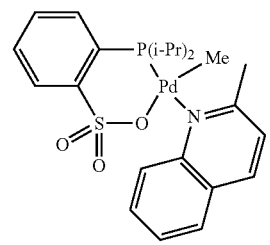

8

A methylene chloride solution of (2-diisopropylphosphino)benzenesulfonic acid (0.22 g, 0.81 mmol) and (TMEDA)PdMe₂ (0.21 g, 0.81 mmol) (8 ml) was stirred under nitrogen atmosphere at room temperature for 0.5 hour. 2-methylquinoline (manufactured by Tokyo Chemical Industry Co., Ltd., 1.2 g, 8.1 mmol) was added to the reaction solution and stirred for another two hours. After condensing the solution, the precipitate was removed by the filtration using a syringe filter, and the solution was added dropwise to hexane. The generated precipitate was recovered by filtration, washed with t-butylmethyl ether and hexane, and dried under reduced pressure to obtain metal complex catalyst 8. The yield was 0.41 g (95%).

¹H-NMR (400 MHz, CDCl₃): δ 0.39 (s, 3H, PdCH₃), 1.30-1.49 (m, 12H, P[CH(CH₃)₂]₂), 2.62-2.69 (m, 2H, P[CH(CH₃)₂]₂), 3.43 (s, 3H, 2-CH₃-quinoline), 7.41-7.64 (m, 5H), 7.81-7.86 (m, 2H), 8.19 (d, 1H, J=8.0 Hz), 8.30 (br, 1H), 9.58 (d, 1H, J=8.0 Hz)

[Synthesis of Metal Complex Catalyst 9]

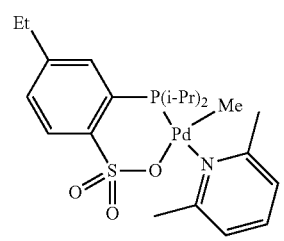

9

A methylene chloride solution of (2-diisopropylphosphino-4-ethylbenzenesulfonic acid) (0.37 g, 1.2 mmol) which was synthesized in the same way as compound 1a using 4-ethylbenzenesulfonic acid (manufactured by Sigma-Aldrich) as a starting material and (TMEDA)PdMe₂ (0.31 g, 1.2 mmol) (8 ml) was stirred under nitrogen atmosphere at room temperature for 0.5 hour. Subsequently, 2,6-lutidine (1.3 g, 12.3 mmol) was added to the reaction solution and further stirred for two hours. After condensing the solution, the precipitate was removed by the filtration using a syringe filter, and the solution was added dropwise to hexane. The generated precipitate was recovered by filtration, washed with t-butylmethyl ether and hexane, and dried under reduced pressure to obtain metal complex catalyst 9. The yield was 0.51 g (77%).

¹H-NMR (400 MHz, CDCl₃): δ 0.33 (s, 3H, PdCH₃), 1.26-1.39 (m, 15H), 2.52-2.73 (m, 4H), 3.18 (s, 6H, CH₃ of lutidine), 7.12 (d, 2H, J=7.2 Hz), 7.33-7.37 (m, 2H), 7.57 (t, 1H, J=7.2 Hz), 8.20 (br, 1H)

[Synthesis of Metal Complex Catalyst 10]

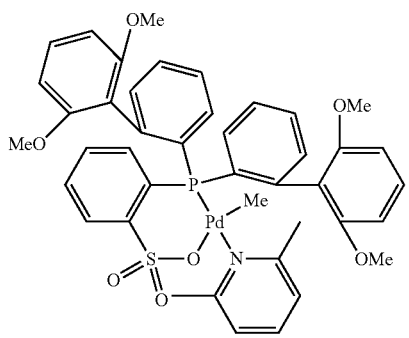

A THF solution of 2-bis(2',6'-dimethoxy-2-biphenyl)phosphinobenzenesulfonic acid) (0.53 g, 0.87 mmol) which was synthesized in the same way as compound 1a using benzenesulfonic acid (manufactured by Sigma-Aldrich) as a starting material and (TMEDA)PdMe$_2$ (0.22 g, 0.87 mmol) (12 ml) was stirred under nitrogen atmosphere at room temperature for 0.5 hour. Subsequently, 2,6-lutidine (0.93 g, 8.7 mmol) was added to the reaction solution and further stirred for four hours. After adding t-butylmethyl ether (10 ml) to the reaction solution, the generated precipitate was recovered by filtration, washed with t-butylmethyl ether and hexane, and dried under reduced pressure to obtain metal complex catalyst 10. The yield was 0.50 g (69%).

$^1$H-NMR (400 MHz, CDCl$_3$): δ 0.16 (s, 3H, PdCH$_3$), 3.14 (s, 6H, CH$_3$ of lutidine), 3.48-3.74 (m, 12H), 6.12-8.27 (m, 21H)

Example 5

Copolymerization of Allyl Acetate and Ethylene
(Preparation of Copolymer 5)

Methylene chloride (3.75 ml), toluene (3.75 ml) and allyl acetate (7.5 ml, 7.0 g, 70 mmol) were added to a 50 ml-volume autoclave containing metal complex catalyst 4 (0.10 mmol) under argon atmosphere. After filling the autoclave with ethylene (3.0 MPa), the content of the autoclave was stirred at 80° C. for three hours. After cooling the autoclave to room temperature, methanol (about 20 ml) was added thereto. The generated copolymer was recovered by filtration, washed with methanol and dried under reduced pressure to obtain copolymer 5. The yield was 0.29 g. The number average molecular weight and weight average molecular weight of the copolymer were calculated 4,000 and 7,000, respectively, by size exclusion chromatography and Mw/Mn was 1.7. The allyl acetate content in the copolymer was determined to be 3.7% by molar ratio by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. The polymerization conditions and results are shown in Tables 1 and 2.

Example 6

Copolymerization of Allyl Acetate and Ethylene
(Preparation of Copolymer 6)

A toluene solution (37.5 ml) of metal complex catalyst 1 (0.10 mmol) was added to a 120 ml-volume autoclave containing allyl acetate (37.5 ml, 34.9 g, 350 mmol) under nitrogen atmosphere. After filling the autoclave with ethylene (3.0 MPa), the content of the autoclave was stirred at 80° C. for five hours. After cooling the autoclave to room temperature, the reaction mixture was added to methanol (400 ml). The generated copolymer was recovered by filtration, washed with methanol and dried under reduced pressure to obtain copolymer 6. The yield was 2.1 g. The number average molecular weight and weight average molecular weight of the copolymer were calculated 14,000 and 29,000, respectively, by size exclusion chromatography and Mw/Mn was 2.1. The allyl acetate content in the copolymer was determined to be 3.8% by molar fraction by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. The polymerization conditions and results are shown in Tables 1 and 2.

Examples 7 to 30

Copolymerization of Allyl Acetate and Ethylene
(Preparation of Copolymers 7 to 30)

Copolymers 7 to 30 were produced in the same way as in Examples 5 and 6. The polymerization conditions and results are shown in Tables 1 and 2.

TABLE 1

| Examples | Autoclave volume | Inert gas | Monomer of formula (1) Ethylene (MPa) | Monomer of formula (2) Allyl acetate (mmol) | Metal complex catalyst (mmol) | Solvent (ml) | Reaction temperature (C. °) | Reaction time (hr) |
|---|---|---|---|---|---|---|---|---|
| Ex. 1 | 50 | Ar | 3.0 | 70 | 1 (0.10) | CH$_2$Cl$_2$ (3.75)/toluene (3.75) | 80 | 3 |
| Ex. 2 | 50 | Ar | 3.0 | 70 | 1 (0.10) | toluene (7.5) | 80 | 3 |
| Ex. 3 | 50 | Ar | 3.0 | 70 | 2 (0.10) | toluene (7.5) | 80 | 3 |
| Ex. 4 | 50 | Ar | 3.0 | 70 | 3 (0.10) | toluene (7.5) | 80 | 3 |
| Comparative Ex. 1 | 120 | N$_2$ | 1.0 | 747 | AIBN (4.5) | None | 90 | 2 |
| Ex. 5 | 50 | Ar | 3.0 | 70 | 4 (0.10) | CH$_2$Cl$_2$ (3.75)/toluene (3.75) | 80 | 3 |
| Ex. 6 | 120 | N$_2$ | 3.0 | 350 | 1 (0.10) | toluene (37.5) | 80 | 5 |
| Ex. 7 | 120 | N$_2$ | 3.0 | 350 | 1 (0.010) | toluene (37.5) | 80 | 5 |
| Ex. 8 | 120 | N$_2$ | 3.0 | 350 | 3 (0.10) | toluene (37.5) | 80 | 5 |
| Ex. 9 | 120 | N$_2$ | 3.0 | 350 | 3 (0.050) | toluene (37.5) | 80 | 5 |

TABLE 1-continued

| Examples | Autoclave volume | Inert gas | Monomer of formula (1) Ethylene (MPa) | Monomer of formula (2) Allyl acetate (mmol) | Metal complex catalyst (mmol) | Solvent (ml) | Reaction temperature (C. °) | Reaction time (hr) |
|---|---|---|---|---|---|---|---|---|
| Ex. 10 | 120 | $N_2$ | 4.0 | 350 | 1 (0.050) | toluene (37.5) | 80 | 5 |
| Ex. 11 | 120 | $N_2$ | 2.0 | 350 | 1 (0.050) | toluene (37.5) | 80 | 5 |
| Ex. 12 | 120 | $N_2$ | 1.0 | 350 | 1 (0.50) | toluene (37.5) | 80 | 5 |
| Ex. 13 | 120 | $N_2$ | 3.0 | 350 | 1 (0.050) | toluene (37.5) | 120 | 5 |
| Ex. 14 | 120 | $N_2$ | 3.0 | 350 | 1 (0.050) | toluene (37.5) | 150 | 5 |
| Ex. 15 | 50 | Ar | 3.0 | 70.0 | 1 (0.10) | o-dichlorobenzene (7.5) | 80 | 3 |
| Ex. 16 | 120 | $N_2$ | 3.0 | 70.0 | 3 (0.050) | toluene (67.5) | 80 | 5 |
| Ex. 17 | 120 | $N_2$ | 3.0 | 700 | 1 (0.050) | None | 80 | 5 |
| Ex. 18 | 120 | $N_2$ | 4.0 | 700 | 1 (0.050) | None | 80 | 5 |
| Ex. 19 | 120 | $N_2$ | 4.0 | 700 | 3 (0.050) | None | 80 | 5 |
| Ex. 20 | 120 | $N_2$ | 3.0 | 350 | 3 (0.050) | toluene (37.5) | 80 | 26 |
| Ex. 21 | 120 | $N_2$ | 3.0 | 350 | 5 (0.025) | toluene (37.5) | 80 | 5 |
| Ex. 22 | 120 | $N_2$ | 3.0 | 350 | 6 (0.10) | toluene (37.5) | 80 | 5 |
| Ex. 23 | 120 | $N_2$ | 3.0 | 350 | 6 (0.050) | toluene (37.5) | 80 | 5 |
| Ex. 24 | 120 | $N_2$ | 3.0 | 350 | 6 (0.010) | toluene (37.5) | 80 | 5 |
| Ex. 25 | 120 | $N_2$ | 3.0 | 350 | 7 (0.050) | toluene (37.5) | 80 | 5 |
| Ex. 26 | 120 | $N_2$ | 3.0 | 350 | 7 (0.010) | toluene (37.5) | 80 | 5 |
| Ex. 27 | 120 | $N_2$ | 3.0 | 350 | 8 (0.050) | toluene (37.5) | 80 | 5 |
| Ex. 28 | 120 | $N_2$ | 3.0 | 350 | 8 (0.010) | toluene (37.5) | 80 | 5 |
| Ex. 29 | 120 | $N_2$ | 3.0 | 350 | 9 (0.050) | toluene (37.5) | 80 | 5 |
| Ex. 30 | 120 | $N_2$ | 3.0 | 350 | 10 (0.050) | toluene (37.5) | 80 | 5 |
| Comparative Ex. 2 | 120 | $N_2$ | 3.0 | None | 1 (0.050) | toluene (75) | 80 | 1 |
| Comparative Ex. 3 | — | — | — | — | With organic aluminum in situ | — | — | — |
| Ex. 31 | 50 | Ar | 3.0 | 70 | | $CH_2Cl_2$ (3.75)/toluene (3.75) | 80 | 15 |
| Ex. 32 | 120 | $N_2$ | 3.0 | 348 | 3 (0.010) | toluene (37.5) | 80 | 5 |
| Ex. 33 | 120 | $N_2$ | 3.0 | 348 | 3 (0.010) | toluene (37.5) | 80 | 25 |
| Ex. 34 | 120 | $N_2$ | 3.0 | 348 | 3 (0.010) | toluene (37.5) | 80 | 50 |
| Ex. 35 | 120 | $N_2$ | 3.0 | 348 | 3 (0.010) | toluene (37.5) | 80 | 100 |

TABLE 2

| | Copolymer No. | Polymer yield (g) | Productivity (g/mmol) | Catalyst Activity (g/mmol · h) | Mn (g/mol) | Mw (g/mol) | Mw/Mn | A* | B* | C* |
|---|---|---|---|---|---|---|---|---|---|---|
| Ex. 1 | 1 | 0.75 | 7.5 | 2.5 | 8100 | 16200 | 2.0 | 3.3 | Not exist | Exist |
| Ex. 2 | 2 | 0.59 | 5.9 | 2.0 | 7900 | 15500 | 2.0 | 4.2 | Not exist | Exist |
| Ex. 3 | 3 | 0.23 | 2.3 | 0.77 | 3400 | 5400 | 1.6 | 2.0 | Not exist | Exist |
| Ex. 4 | 4 | 0.53 | 5.3 | 1.8 | 6700 | 12700 | 1.9 | 2.6 | Not exist | Exist |
| Comparative Ex. 1 | Comparative 1 | 7.3 | 1.6 | 0.81 | 1600 | 2800 | 1.8 | 100.0 | — | — |
| Ex. 5 | 5 | 0.29 | 2.9 | 0.97 | 4000 | 7000 | 1.7 | 3.7 | Not exist | Exist |
| Ex. 6 | 6 | 2.1 | 20.5 | 4.1 | 14000 | 29000 | 2.1 | 3.8 | Not exist | Exist |
| Ex. 7 | 7 | 0.54 | 54.0 | 10.9 | 15000 | 32000 | 2.1 | 3.3 | Not exist | Exist |
| Ex. 8 | 8 | 3.0 | 30.4 | 6.1 | 11000 | 26000 | 2.4 | 4.0 | Not exist | Exist |
| Ex. 9 | 9 | 2.3 | 45.7 | 9.1 | 11000 | 26000 | 2.4 | 3.9 | Not exist | Exist |
| Ex. 10 | 10 | 2.7 | 53.1 | 10.6 | 16000 | 34000 | 2.1 | 2.4 | Not exist | Exist |
| Ex. 11 | 11 | 0.57 | 11.3 | 2.3 | 10000 | 21000 | 2.1 | 5.7 | Not exist | Exist |
| Ex. 12 | 12 | 0.22 | 0.44 | 0.09 | 4000 | 6000 | 1.7 | 11.7 | Not exist | Exist |
| Ex. 13 | 13 | 1.6 | 31.4 | 6.3 | 7000 | 15000 | 2.1 | 6.0 | Not exist | Exist |
| Ex. 14 | 14 | 0.64 | 12.8 | 2.6 | 6000 | 13000 | 2.2 | 5.8 | Not exist | Exist |
| Ex. 15 | 15 | 1.1 | 10.8 | 3.6 | 9000 | 21000 | 2.4 | 3.9 | Not exist | Exist |
| Ex. 16 | 16 | 3.6 | 72.9 | 14.6 | 16000 | 42000 | 2.6 | 1.0 | Not exist | Exist |
| Ex. 17 | 17 | 1.1 | 21.3 | 4.3 | 8000 | 17000 | 2.1 | 8.2 | Not exist | Exist |
| Ex. 18 | 18 | 2.0 | 39.9 | 8.0 | 10000 | 24000 | 2.4 | 5.7 | Not exist | Exist |
| Ex. 19 | 19 | 3.1 | 62.2 | 12.4 | 9000 | 23000 | 2.5 | 4.4 | Not exist | Exist |
| Ex. 20 | 20 | 5.6 | 111.8 | 4.3 | 11000 | 25000 | 2.3 | 4.4 | Not exist | Exist |
| Ex. 21 | 21 | 0.30 | 6.0 | 1.2 | 8000 | 16000 | 2.1 | 3.2 | Not exist | Exist |
| Ex. 22 | 22 | 3.7 | 37.3 | 7.5 | 8000 | 16000 | 2.1 | 3.2 | Not exist | Exist |
| Ex. 23 | 23 | 1.9 | 38.2 | 7.6 | 9000 | 21000 | 2.3 | 4.0 | Not exist | Exist |
| Ex. 24 | 24 | 0.82 | 81.6 | 16.3 | 11000 | 25000 | 2.3 | 3.6 | Not exist | Exist |
| Ex. 25 | 25 | 0.39 | 7.8 | 1.6 | 8000 | 17000 | 2.2 | 3.5 | Not exist | Exist |
| Ex. 26 | 26 | 0.29 | 29.4 | 5.9 | 12000 | 26000 | 2.2 | 3.1 | Not exist | Exist |
| Ex. 27 | 27 | 0.62 | 12.4 | 2.5 | 9000 | 19000 | 2.1 | 3.1 | Not exist | Exist |
| Ex. 28 | 28 | 0.42 | 42.0 | 8.4 | 11000 | 24000 | 2.2 | 3.2 | Not exist | Exist |

TABLE 2-continued

| | Co-polymer No. | Polymer yield (g) | Productivity (g/mmol) | Catalyst Activity (g/mmol·h) | Molecular weight Mn (g/mol) | Mw (g/mol) | Mw/Mn | A* | B* | C* |
|---|---|---|---|---|---|---|---|---|---|---|
| Ex. 29 | 29 | 0.47 | 9.4 | 1.9 | 13000 | 29000 | 2.2 | 3.0 | Not exist | Exist |
| Ex. 30 | 30 | 1.7 | 34.0 | 6.8 | 37000 | 85000 | 2.3 | 1.3 | Not exist | Exist |
| Comparative Ex. 2 | Comparative 2 | 8.3 | 166.0 | 166.0 | 30000 | 70000 | 2.3 | 0.0 | — | — |
| Comparative Ex. 3 | Comparative 3 | — | — | — | — | — | — | — | — | Not exist |
| Ex. 31 | 31 | 1.7 | 17 | 1.1 | 4000 | 9000 | 2.3 | 2.7 | Not exist | Exist |
| Ex. 32 | 32 | 0.89 | 89 | 17.8 | 13000 | 29000 | 2.2 | 3.3 | Not exist | Exist |
| Ex. 33 | 33 | 2.1 | 210 | 8.4 | 12000 | 28000 | 2.3 | 4.0 | Not exist | Exist |
| Ex. 34 | 34 | 3.7 | 370 | 7.4 | 11000 | 25000 | 2.3 | 3.8 | Not exist | Exist |
| Ex. 35 | 35 | 6.2 | 620 | 6.2 | 11000 | 25000 | 2.3 | 3.9 | Not exist | Exist |
| Ex. 36 | 36 | 0.86 | — | — | 12000 | 26000 | 2.0 | 3.2 | Not exist | Exist |
| Ex. 37 | 37 | 2.8 | — | — | 11000 | 26000 | 2.4 | 3.8 | Not exist | Exist |

A*: Molar fraction of the allyl compound monomer units (mol %)
B*: Presence or absence of a branch having two or more carbon atoms (δc = 38.2 ppm)
C*: Presence or absence of a terminal double bond (δc = 114 ppm, 139 ppm)

Comparative Example 2

Ethylene Homopolymerization

Ethylene homopolymerization was conducted using metal complex catalyst 1. That is, a toluene solution (75 ml) of metal complex catalyst 1 (0.050 mmol) was added to a 120 ml-volume autoclave under nitrogen atmosphere. After filling the autoclave with ethylene (3.0 MPa), the content of the autoclave was stirred at 80° C. for one hour. After cooling the autoclave to room temperature, the reaction mixture was added to methanol (400 ml). The generated copolymer was recovered by filtration, washed with methanol and dried under reduced pressure. The yield was 8.3 g. The number average molecular weight and weight average molecular weight of the copolymer were calculated 30,000 and 70,000, respectively, by size exclusion chromatography and Mw/Mn was 2.1.

Comparative Example 3

The Case where Organic Aluminum was Used

When polar group-containing monomers are (co)polymerized using an early transition metal complex, organic aluminum is used in an amount that is equal to or more than the polar group-containing monomers. In this case, it has been reported in a publication that the polymer chain transfers to aluminum atoms, which terminates the polymerization reaction, and therefore a terminal double bond is not observed in the polymer (Macromolecules 2004, 37, 5145).

Example 31

Copolymerization of Ally Acetate and Ethylene (In-Situ Preparation of Copolymer 31)

Methylene chloride (3.75 ml), toluene (3.75 ml) and allyl acetate (7.5 ml, 7.0 g, 70 mmol) were added to a 50 ml-volume autoclave containing 2-(diisopropylphosphino)benzenesulfonic acid (0.12 mmol) and $Pd_2(DBA)_3 \cdot CHCl_3$ (DBA: dibenzylideneacetone, 0.10 mmol) under argon atmosphere. After filling the autoclave with ethylene (3.0 MPa), the content of the autoclave was stirred at 80° C. for 15 hours. After cooling the autoclave to room temperature, methanol (about 20 ml) was added thereto. The generated precipitate was recovered by filtration, washed with methanol and dried under reduced pressure to obtain copolymer 31. The yield was 1.7 g. The number average molecular weight and weight average molecular weight of the copolymer were calculated 4,000 and 9,000, respectively, by size exclusion chromatography and Mw/Mn was 2.7. The allyl acetate content in the copolymer was determined to be 2.7% by molar fraction by $^{13}C$-NMR spectrum using the inverse-gated decoupling method. The $^{13}C$-NMR signal was not observed in the chemical shift value of the tertiary carbon atoms (δc=38.2 ppm) derived from a branch having two or more carbon atoms. Also, $^{13}C$-NMR signal was observed at 114 ppm and 139 ppm, which was derived from a terminal double bond, and the copolymer was confirmed to be a linear polymer containing a terminal double bond.

Example 32

Copolymerization of Allyl Acetate and Ethylene (Preparation of Copolymer 32)

A toluene solution (37.5 ml) of metal complex catalyst 3 (0.010 mmol) was added to a 120 ml-volume autoclave containing allyl acetate (37.5 ml, 34.9 g, 348 mmol) under nitrogen atmosphere. After filling the autoclave with ethylene (3.0 MPa), the content of the autoclave was stirred at 80° C. for five hours. After cooling the autoclave to room temperature, the reaction mixture was added to methanol (about 400 ml). The generated precipitate was recovered by filtration, washed with methanol and dried under reduced pressure to obtain copolymer 32. The yield was 0.89 g. The number average molecular weight and weight average molecular weight of the copolymer were calculated 13,000 and 29,000, respectively, by size exclusion chromatography and Mw/Mn was 2.2. The allyl acetate content in the copolymer was determined to be 3.3% by molar fraction by $^{13}C$-NMR spectrum using the inverse-gated decoupling method. The $^{13}C$-NMR signal was not observed in the chemical shift value of the tertiary carbon atoms (δc=38.2 ppm) derived from a branch having two or more carbon atoms. Also, $^{13}C$-NMR signal was observed at 114 ppm and 139 ppm, which was derived from a terminal double bond, and the copolymer was confirmed to be a linear polymer containing a terminal double bond.

Examples 33 to 35

Copolymerization of Allyl Acetate and Ethylene (Preparation of Copolymers 33 to 35)

Copolymers 33 to 35 were obtained in the same manner as in Example 32 except for setting the reaction time to 25 hours, 50 hours and 100 hours, respectively. The polymerization conditions and results are shown in Tables 1 and 2.

Figure 16:
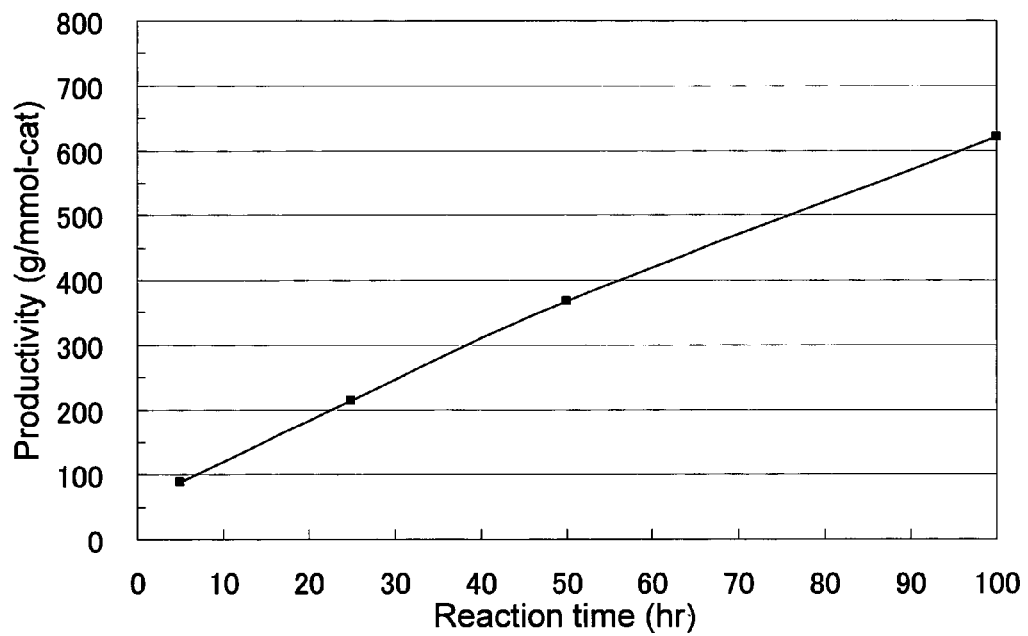
FIG. 16 A graph indicating the relationship between the polymerization time and the polymer productivity per catalyst in Examples 32 to 35

The polymer productivity per catalyst with respect to the polymerization time in Examples 32 to 35 is shown as a graph in FIG. 16. It can be seen that the present polymerization catalyst system shows very little loss of catalyst activity and the polymer yield increases with the polymerization time. This greatly differs from the phenomenon in copolymerization of ethylene and vinyl acetate that the polymerization activity decreases with the polymerization time and the polymer productivity hits a peak (e.g.: see "J. Am. Chem. Soc.", 2009, 131, 14606, Supporting Information S10) and shows that the present invention is an effective technology for promoting industrialization.

Example 36

Saponification Reaction of the Allyl Acetate and Ethylene Copolymer (Preparation of Copolymer 36)

Figure 5:
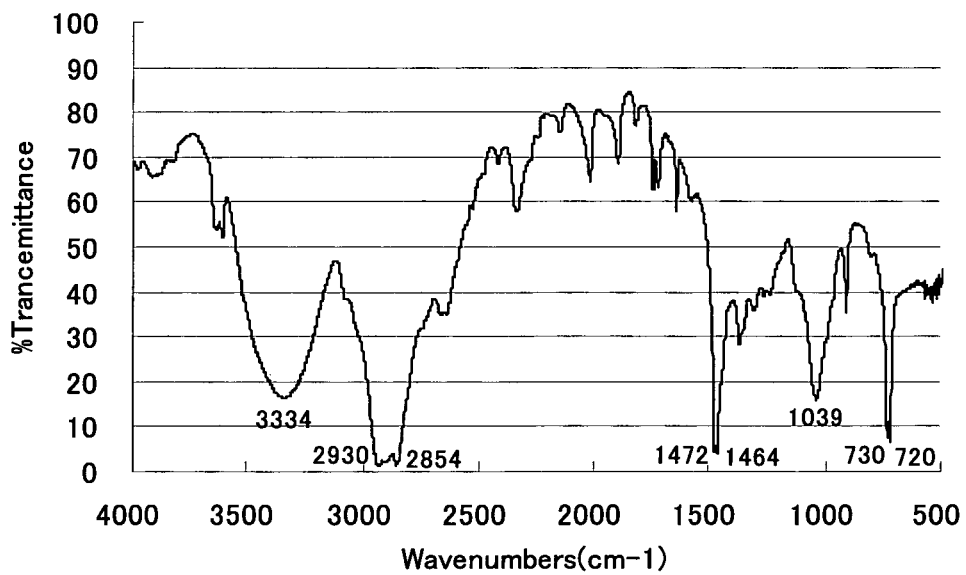
FIG. 5 The IR spectrum of the ethylene/allyl alcohol copolymer obtained in Example 36
Figure 6:
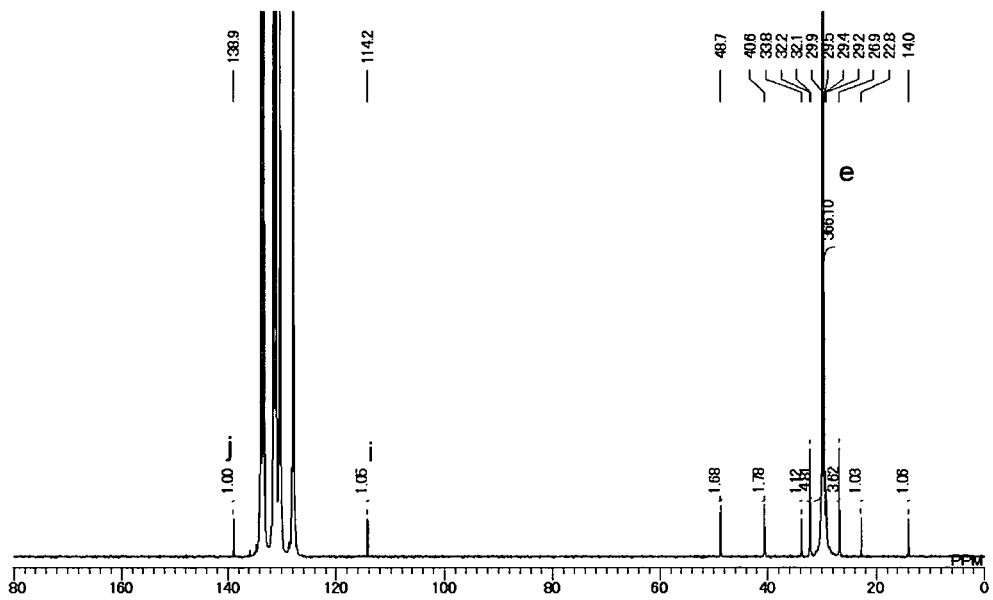
FIG. 6 The $^{13}$C-NMR spectrum of the ethylene/allyl chloride copolymer obtained in Example 41
Figure 7:
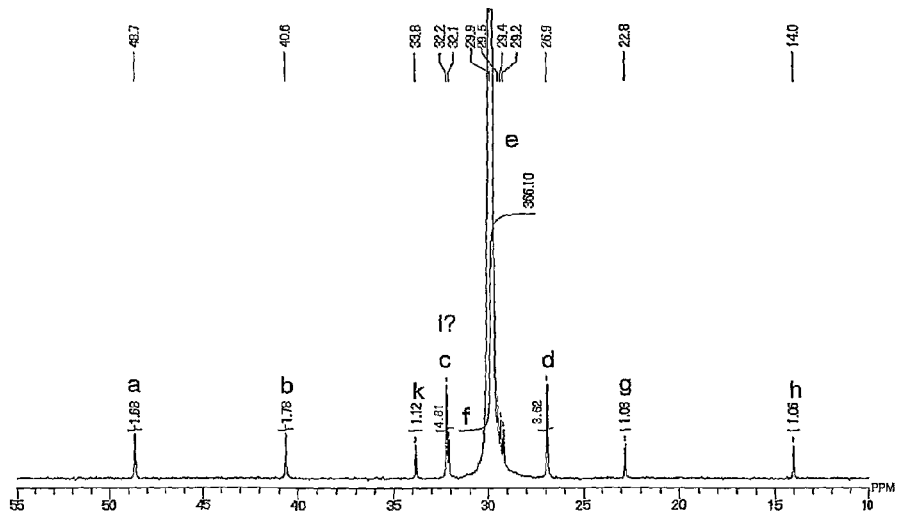
FIG. 7 An enlarged view of the portion at 10 to 55 ppm of FIG. 6
Figure 8:
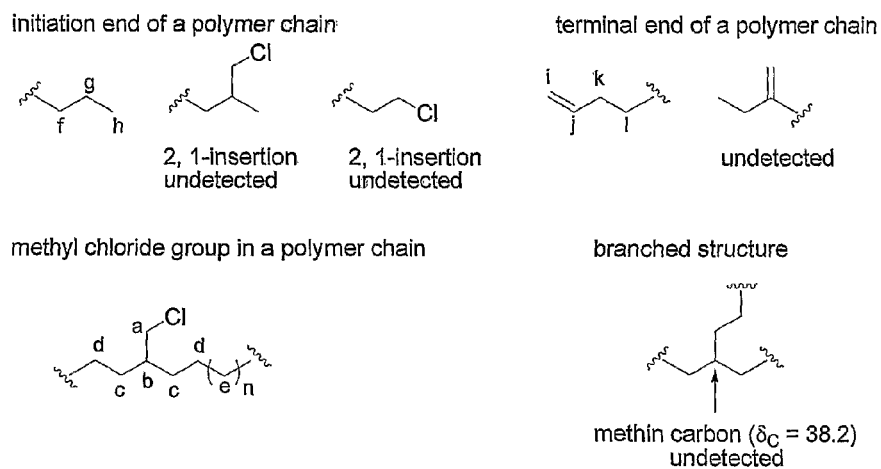
FIG. 8 A figure showing a terminal structure, a chemical shift of the $^{13}$C-NMR spectrum, and the carbon identification in the alphabet in the polymer analysis of Example 41
Figure 9:
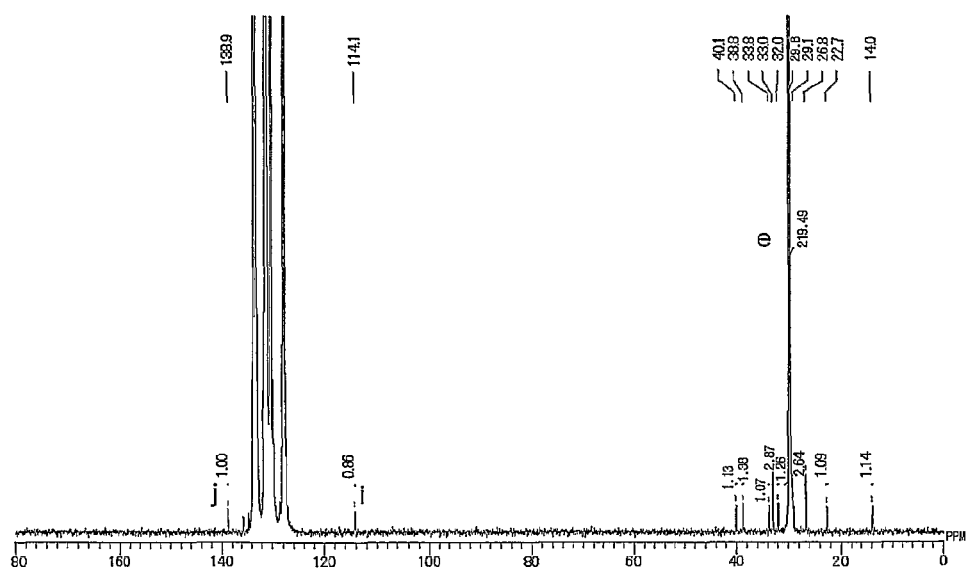
FIG. 9 The $^{13}$C-NMR spectrum of the ethylene/allyl bromide copolymer obtained in Example 44
Figure 10:
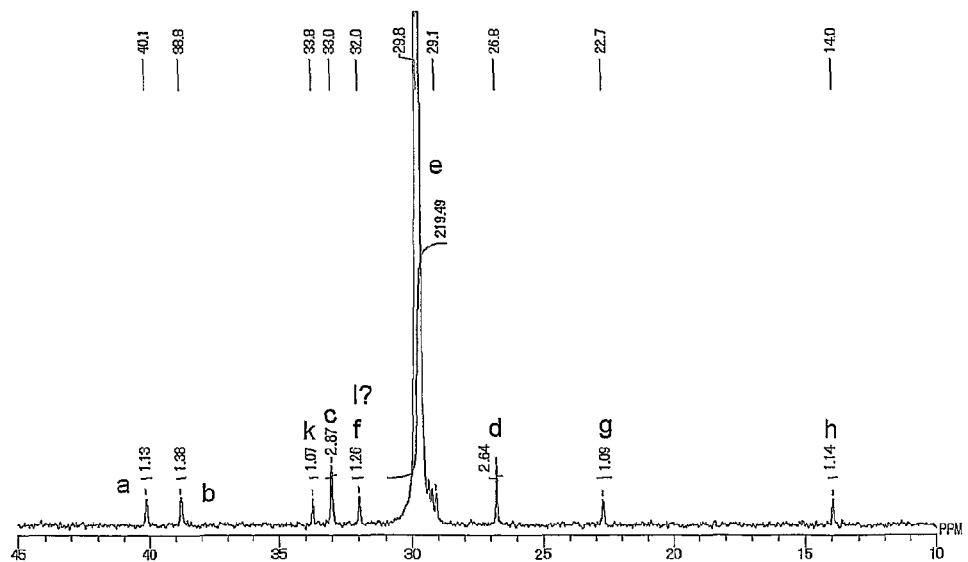
FIG. 10 An enlarged view of the portion at 10 to 45 ppm of FIG. 9
Figure 11:
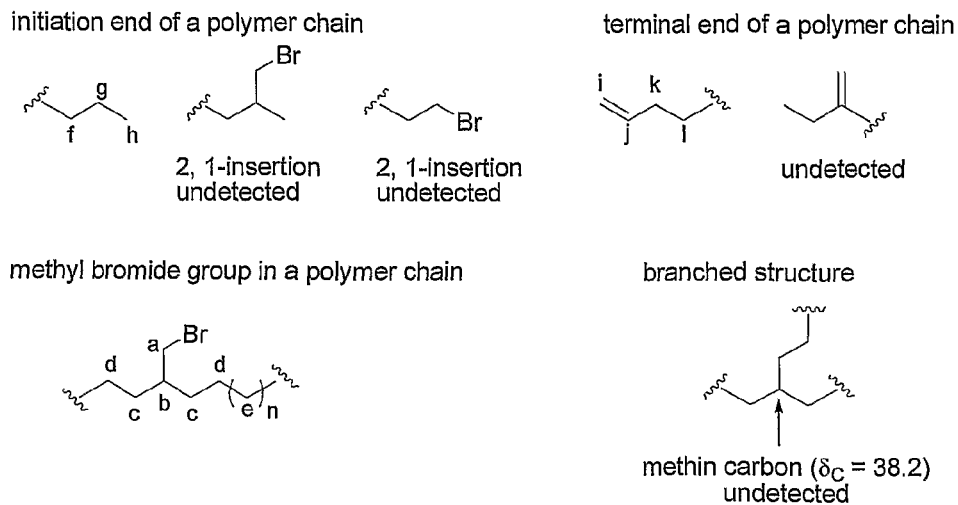
FIG. 11 A figure showing a terminal structure, a chemical shift of the $^{13}$C-NMR spectrum, and the carbon identification in the alphabet in the polymer analysis of Example 44
Figure 12:
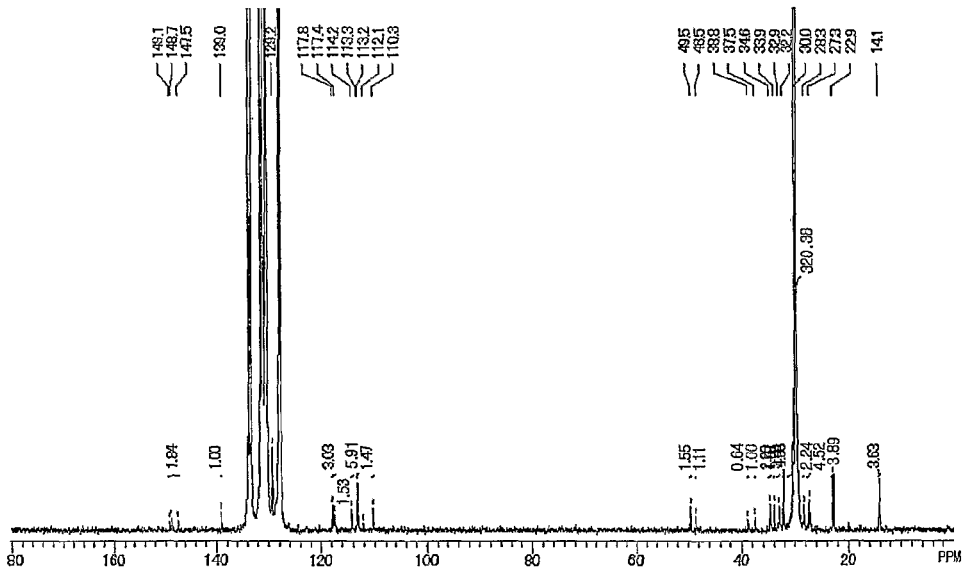
FIG. 12 The $^{13}$C-NMR spectrum of the ethylene/N-allylaniline copolymer obtained in Example 46
Figure 13:
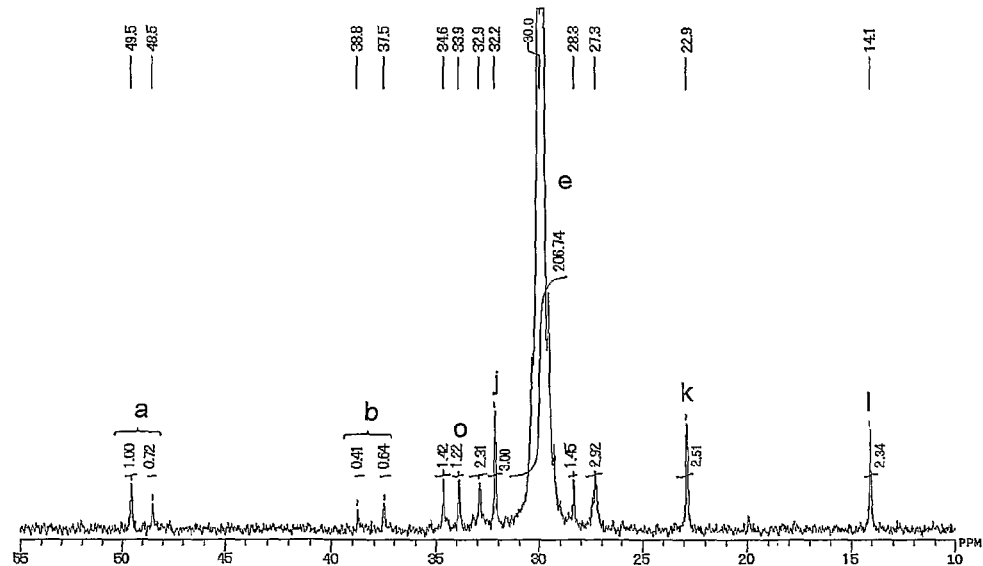
FIG. 13 An enlarged view of the portion at 10 to 55 ppm of FIG. 12
Figure 14:
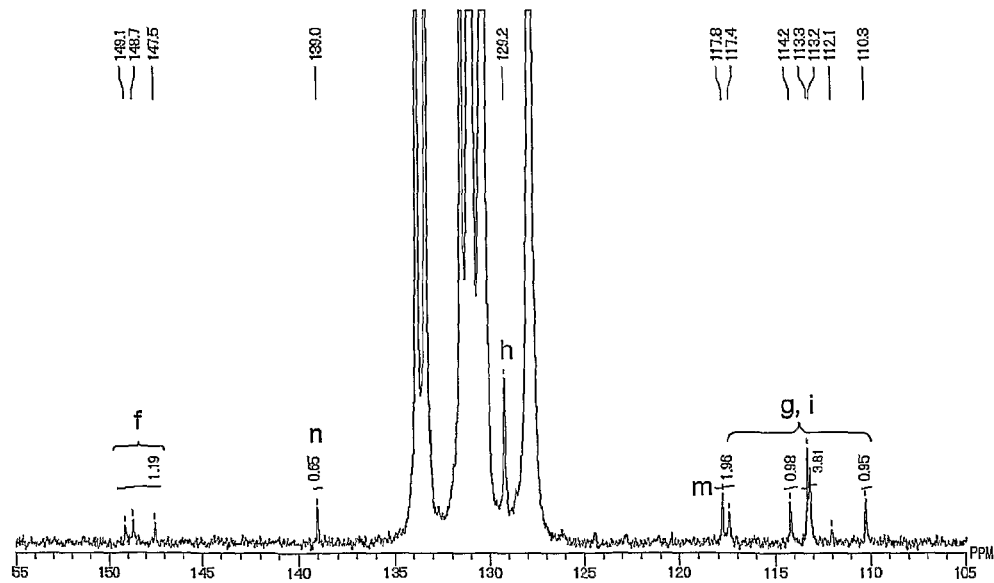
FIG. 14 An enlarged view of the portion at 105 to 155 ppm of FIG. 12
Figure 15:
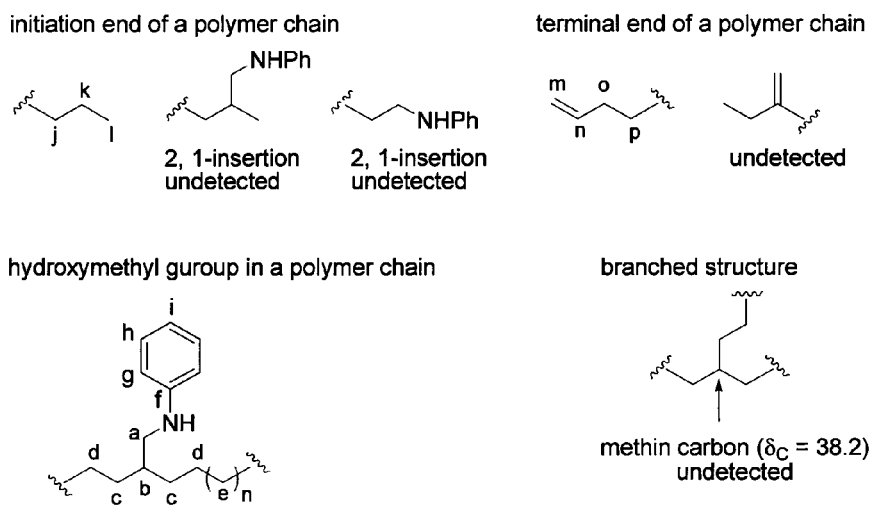
FIG. 15 A figure showing a terminal structure, a chemical shift of the $^{13}$C-NMR spectrum, and the carbon identification in the alphabet in the polymer analysis of Example 46

A toluene (115 ml) and ethanol (35 ml) suspension of the allyl acetate and ethylene copolymer obtained in Example 6 (1.0 g) and potassium hydroxide (0.056 g, 1.1 mmol) was stirred under nitrogen atmosphere at 80° C. for six hours. After being cooled to room temperature, the reaction solution was added to methanol (500 ml). The generated precipitate was recovered by filtration, washed with methanol and then dried under reduced pressure to obtain copolymer 36. The yield was 0.86 g. The analysis of the obtained powder by $^{13}$C-NMR and IR spectra showed that the ester groups present in the allyl acetate and ethylene copolymer were completely converted to hydroxyl groups and the powder is a copolymer of allyl alcohol and ethylene. The IR spectrum is shown in FIG. 5. The allyl alcohol content was determined to be 3.2% by molar fraction by $^{13}$C-NMR. The $^{13}$C-NMR signal was not observed in the chemical shift value of the tertiary carbon atoms ($\delta c$=38.2 ppm) derived from a branch having two or more carbon atoms. Also, $^{13}$C-NMR signal was observed at 114 ppm and 139 ppm, which was derived from a terminal double bond, and the copolymer was confirmed to be a polymer containing a terminal double bond. In addition, the number average molecular weight and weight average molecular weight of the copolymer were calculated 12,000 and 26,000, respectively, by size exclusion chromatography and Mw/Mn was 2.2.

Example 37

Partial Saponification Reaction of the Allyl Acetate and Ethylene Copolymer (Preparation of Copolymer 37)

A toluene (75 ml) and ethanol (5 ml) suspension of the allyl acetate and ethylene copolymer obtained in Example 20 (3.0 g) and potassium hydroxide (0.0023 g, 0.042 mmol) was stirred at 80° C. for 30 minutes under nitrogen atmosphere. After being cooled to room temperature, the reaction solution was added to methanol (500 ml). The generated precipitate was recovered by filtration, washed with methanol and then dried under reduced pressure to obtain copolymer 37. The yield was 2.8 g. The analysis of $^{13}$C-NMR of the obtained powder showed that 2.0% of allyl acetate units and 1.8% of allyl alcohol units by molar fraction were present in the powder. The $^{13}$C-NMR signal was not observed in the chemical shift value of the tertiary carbon atoms ($\delta c$=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. In addition, the number average molecular weight and weight average molecular weight of the copolymer were calculated 11,000 and 26,000, respectively, by size exclusion chromatography and Mw/Mn was 2.4.

Example 38

Copolymerization of Allyl Alcohol and Ethylene (Preparation of Copolymer 38)

A toluene solution (60 ml) of metal complex catalyst 1 (0.15 mmol) was added to a 120 ml-volume autoclave containing allyl alcohol (15 ml, 12.8 g, 219.8 mmol) under nitrogen atmosphere. After filling the autoclave with ethylene (4.0 MPa), the content of autoclave was stirred at 80° C. for seven hours. After being cooled to room temperature, the reaction solution was added to methanol (400 ml). The generated copolymer was recovered by filtration, washed with methanol and then dried under reduced pressure to obtain copolymer 38. The yield was 0.12 g. The number average molecular weight and weight average molecular weight of the copolymer were calculated 2,000 and 3,400, respectively, by size exclusion chromatography and Mw/Mn was 1.7. The allyl acetate content in the copolymer was determined to be 2.7% by molar fraction by $^{13}$C-NMR spectrum using the inverse-gated decoupling method.

Examples 39 to 40

Copolymerization of Allyl Alcohol and Ethylene (Preparation of Copolymers 39 and 40)

Copolymers 39 and 40 were produced in the same manner as in Example 38 except for setting the conditions shown in Table 3. The results are shown in Table 4.

Example 41

Copolymerization of Allyl Chloride and Ethylene (Preparation of Copolymer 41)

Toluene (12 ml) and allyl chloride (3 ml, 2.8 g, 36.8 mmol) were added under argon atmosphere to a 50 ml-volume autoclave containing metal complex catalyst 1 (0.10 mmol). After filling the autoclave with ethylene (3.0 MPa), the content of autoclave was stirred at 80° C. for 15 hours. After being cooled to room temperature, methanol (30 ml) was added to the autoclave. The generated copolymer was recovered by filtration, washed with methanol and then dried under reduced pressure to obtain copolymer 41. The yield was 0.41 g. The number average molecular weight and weight average molecular weight of the copolymer were calculated 10,000 and 19,000, respectively, by size exclusion chromatography and Mw/Mn was 1.9. The allyl chloride content in the copolymer was determined to be 1.0% by molar fraction by $^{13}$C-NMR spectrum using the inverse-gated decoupling method. The $^{13}$C-NMR signal was not observed in the chemical shift value of the tertiary carbon atoms ($\delta c$=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond.

Examples 42 to 43

Copolymerization of Allyl Chloride and Ethylene
(Preparation of Copolymers 42 and 43)

Copolymers 42 and 43 were produced in the same manner as in Example 41 except for setting the conditions shown in Table 3. The results are shown in Table 4.

Example 44

Copolymerization of Allyl Bromide and Ethylene
(Preparation of Copolymer 44)

Toluene (12 ml) and allyl bromide (3 ml, 4.3 g, 35.5 mmol) were added under argon atmosphere to a 50 ml-volume autoclave containing metal complex catalyst 1 (0.10 mmol). After filling the autoclave with ethylene (3.0 MPa), the content of autoclave was stirred at 80° C. for 15 hours. After being cooled to room temperature, methanol (30 ml) was added to the autoclave. The generated copolymer was recovered by filtration, washed with methanol and then dried under reduced pressure to obtain copolymer 44. The yield was 0.34 g. The number average molecular weight and weight average molecular weight of the copolymer were calculated 8,000 and 15,000, respectively, by size exclusion chromatography and Mw/Mn was 1.9. The allyl chloride content in the copolymer was determined to be 0.71% by molar fraction by $^{13}$C-NMR spectrum using the inverse-gated decoupling method. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond.

Example 45

Copolymerization of Allyl Bromide and Ethylene
(Preparation of Copolymer 45)

Copolymer 45 was produced in the same manner as in Example 44 except for setting the conditions shown in Table 3. The results are shown in Table 4.

Example 46

Copolymerization of N-Allylaniline and Ethylene
(Preparation of Copolymer 46)

Toluene (12 ml) and N-allyliniline (3 ml, 2.9 g, 22.1 mmol) were added under argon atmosphere to a 50 ml-volume autoclave containing metal complex catalyst 1 (0.10 mmol). After filling the autoclave with ethylene (5.0 MPa), the content of autoclave was stirred at 120° C. for 15 hours. After being cooled to room temperature, methanol (30 ml) was added to the autoclave. The generated copolymer was recovered by filtration, washed with methanol and then dried under reduced pressure to obtain copolymer 46. The yield was 0.13 g. The $^{13}$C-NMR signal was not observed in the chemical shift value of the tertiary carbon atoms (δc=38.2 ppm) derived from a branch having two or more carbon atoms. Also, $^{13}$C-NMR signal was observed at 114 ppm and 139 ppm, which was derived from a terminal double bond, and the copolymer was confirmed to be a linear polymer containing a terminal double bond. The number average molecular weight and weight average molecular weight of the copolymer were calculated 1,500 and 3,100, respectively, by size exclusion chromatography and Mw/Mn was 2.1.

Example 47

Copolymerization of N-Allylaniline and Ethylene
(Preparation of Copolymer 47)

Copolymer 47 was produced in the same manner as in Example 46 except that the conditions are set as shown in Table 3. The results are shown in Table 4. The number average molecular weight and weight average molecular weight of the copolymer were calculated 2,100 and 3,200, respectively, by size exclusion chromatography and Mw/Mn was 1.5.

Example 48

Copolymerization of
N-t-Butoxycarbonyl-N-Allylamine and Ethylene
(Preparation of Copolymer 48)

Toluene (15 ml) and N-t-butoxycarbonyl-N-allylamine (2.4 g, 15.0 mmol) were added under argon atmosphere to a 50 ml-volume autoclave containing metal complex catalyst 1 (0.10 mmol). After filling the autoclave with ethylene (3.0 MPa), the content of autoclave was stirred at 80° C. for three hours. After being cooled to room temperature, methanol (30 ml) was added to the autoclave. The generated copolymer was recovered by filtration, washed with methanol and then dried under reduced pressure to obtain copolymer 48. The yield was 1.9 g. The number average molecular weight and weight average molecular weight of the copolymer were calculated 5,200 and 12,200, respectively, by size exclusion chromatography and Mw/Mn was 2.4. The N-t-butoxycarbonyl-N-allylamine content in the copolymer was determined to be 3.7% by molar fraction by $^{13}$C-NMR spectrum using the inverse-gated decoupling method.

Example 49

Hydrolysis Reaction of
N-t-butoxycarbonyl-N-Allylamine and Ethylene
(Preparation of Copolymer 49)

Toluene (40 ml), ethyl alcohol (12 ml) and 35% hydrochloric acid (20 ml) were added under nitrogen atmosphere to a 100 ml-volume eggplant flask containing the copolymer of N-t-butoxycarbonyl-N-allylamine and ethylene obtained in Example 48 (0.302 g), and stirred at 78° C. for three hours. After being cooled to room temperature, the solution was neutralized by adding sodium carbonate. After being washed with water four times, the solution was dried under reduced pressure to obtain copolymer 49. The yield was 0.237 g. The allylamine content in the copolymer was determined to be 2.0% by molar fraction by $^{13}$C-NMR spectrum using the inverse-gated decoupling method. The number average molecular weight and weight average molecular weight of the copolymer were calculated 2,600 and 4,700, respectively, by size exclusion chromatography and Mw/Mn was 1.8. The $^{13}$C-NMR signal was not observed in the chemical shift value of the tertiary carbon atoms (δc=38.2 ppm) derived from a branch having two or more carbon atoms.

TABLE 3

| Examples | Autoclave volume | Inert gas | Monomer of formula (1) Ethylene (MPa) | Monomer of formula (2) Type * (mmol) | Metal complex catalyst (mmol) | Solvent (ml) | Reaction temperature (C. °) | Reaction time (hr) |
|---|---|---|---|---|---|---|---|---|
| Ex. 38 | 120 | $N_2$ | 4.0 | AAL (219.8) | 1 (0.15) | toluene (60) | 80 | 7 |
| Ex. 39 | 50 | Ar | 4.0 | AAL (44.0) | 3 (0.15) | toluene (12) | 80 | 7 |
| Ex. 40 | 50 | Ar | 4.0 | AAL (44.0) | 1 (0.10) | toluene (12) | 80 | 48 |
| Ex. 41 | 50 | Ar | 3.0 | AL-CL (36.8) | 1 (0.10) | toluene (12) | 80 | 15 |
| Ex. 42 | 50 | Ar | 3.0 | AL-CL (36.8) | 3 (0.15) | toluene (12) | 90 | 15 |
| Ex. 43 | 50 | Ar | 3.0 | AL-CL (36.8) | 1 (0.10) | toluene (12) | 80 | 3 |
| Ex. 44 | 50 | Ar | 3.0 | AL-Br (35.5) | 1 (0.10) | toluene (12) | 80 | 15 |
| Ex. 45 | 50 | Ar | 3.0 | AL-Br (35.5) | 1 (0.10) | toluene (12) | 80 | 3 |
| Ex. 46 | 50 | Ar | 5.0 | AL-ANL (22.1) | 1 (0.10) | toluene (12) | 120 | 15 |
| Ex. 47 | 50 | Ar | 5.0 | AL-ANL (22.1) | 1 (0.10) | toluene (12) | 120 | 24 |
| Ex. 48 | 50 | Ar | 3.0 | AL-Boc (15.0) | 1 (0.10) | toluene (15) | 80 | 3 |

* AAL: allyl alcohol
AL-CL: allyl chloride
AL-Br: allyl bromide
AL-ANL: N-allylaniline
AL-Boc: N-t-butoxycarbonyl-N-allylamine

TABLE 4

| | Co-polymer No. | Polymer yield (g) | Productivity (g/mmol) | Catalyst Activity (g/mmol·h) | Molecular weight Mn (g/mol) | Mw (g/mol) | Mw/Mn | A* | B* | C* |
|---|---|---|---|---|---|---|---|---|---|---|
| Ex. 38 | 38 | 0.12 | 0.80 | 0.070 | 2000 | 3400 | 1.7 | 2.7 | Not exist | Exist |
| Ex. 39 | 39 | 0.017 | 0.11 | 0.020 | — | — | — | 3.0 | Not exist | Exist |
| Ex. 40 | 40 | 0.19 | 1.9 | 0.040 | 1100 | 2000 | 1.8 | 5.5 | Not exist | Exist |
| Ex. 41 | 41 | 0.41 | 4.1 | 0.27 | 10000 | 19000 | 1.9 | 1.0 | Not exist | Exist |
| Ex. 42 | 42 | 0.88 | 5.9 | 0.39 | 10000 | 18000 | 1.8 | 0.87 | Not exist | Exist |
| Ex. 43 | 43 | 0.47 | 4.7 | 1.6 | 10900 | 20400 | 1.9 | 0.90 | Not exist | Exist |
| Ex. 44 | 44 | 0.34 | 3.4 | 0.22 | 8000 | 15000 | 1.9 | 0.71 | Not exist | Exist |
| Ex. 45 | 45 | 0.27 | 2.7 | 0.90 | 6500 | 11300 | 1.7 | 1.0 | Not exist | Exist |
| Ex. 46 | 46 | 0.13 | 1.3 | 0.087 | 1600 | 3100 | 2.1 | — | Not exist | Exist |
| Ex. 47 | 47 | 0.21 | 2.1 | 0.088 | 2100 | 3200 | 1.5 | — | Not exist | Exist |
| Ex. 48 | 48 | 1.9 | 19 | 6.3 | 5200 | 12200 | 2.4 | 3.7 | Not exist | Exist |
| Ex. 49 | 49 | 0.24 | — | — | 2600 | 4700 | 1.8 | 2.0 | Not exist | Exist |

A*: Molar fraction of the allyl compound monomer units (mol %)
B*: Presence or absence of a branch having two or more carbon atoms (δc = 38.2 ppm)
C*: Presence or absence of a terminal double bond (δc = 114 ppm, 139 ppm)

The invention claimed is:

1. A method for producing a copolymer of polar group-containing allyl monomers having monomer units represented by formulae (3) and (4)

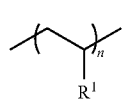

(3)

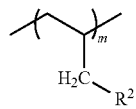

(4)

(in the formulae, $R^1$ represents a hydrogen atom or hydrocarbon group having 1 to 6 carbon atoms;

$R^2$ represents —OH, —OCOR$^3$ ($R^3$ represents hydrocarbon group having 1 to 5 carbon atoms), —N(R$^4$)$_2$ ($R^4$ represents a hydrogen atom, hydrocarbon group having 1 to 5 carbon atoms, aromatic residue having 6 to 18 carbon atoms or —COOR$^{10}$ ($R^{10}$ represents hydrocarbon group having 1 to 10 carbon atoms or aromatic residue having 6 to 10 carbon atoms) and two $R^4$s may be the same or different from each other) or a halogen atom; and n and m are a value representing the molar ratio of each of the monomer units, comprising copolymerization of olefin represented by formula (1)

$$CH_2=CHR^1 \qquad (1)$$

(in the formula, $R^1$ has the same meaning as described above) and an allyl compound represented by formula (2)

$$CH_2=CHCH_2R^2 \qquad (2)$$

(in the formula, $R^2$ has the same meaning as described above) using as a catalyst a metal complex represented by formula (C1)

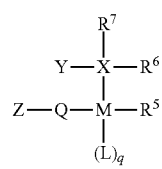

(C1)

(in the formula, M represents a metal atom of group 10 element in the periodic system; X represents a phosphorous atom (P) or an arsenic atom (As); $R^5$ represents a hydrogen atom or hydrocarbon group having 1 to 30 carbon atoms which may be substituted by one or more groups selected from a halogen atom, alkoxy group, aryloxy group and acyloxy group; Y, $R^6$ and $R^7$ independently represent a hydrogen atom, alkoxy group, aryloxy group, silyl group, amino group or hydrocarbon group having 1 to 30 carbon atoms which may be substituted by one or more groups selected from a halogen atom, alkoxy group and aryloxy group; and $R^6$ and $R^7$ may bond to each other to form a ring structure; Q represents a bivalent group indicated in the brackets of Z[—S(=O)$_2$—O-]M, Z[—C(=O)—O-]M, Z[—P(=O)(—OH)—O-]M or Z[—S-]M, wherein Z and M at the beginning and at the end of the formulae are described to show the coupling direction of the groups; Z represents a hydrogen atom or a hydrocarbon group having 1 to 40 carbon atoms which may be substituted by one or more groups selected from a halogen atom, alkoxy group and aryloxy group; Y and Z may bond to each other to form a ring structure; $R^6$ and/or $R^7$ may bond to Y to form a ring structure; L represents an electron-donating ligand and q is 0, ½, 1 or 2).

2. The method for producing a copolymer as claimed in claim 1, wherein the catalyst represented by formula (C1) is represented by formula (C2)

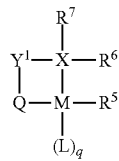

(C2)

(in the formula, $Y^1$ represents bivalent hydrocarbon group having 1 to 70 carbon atoms which may be substituted by one or more groups selected from a halogen atom, alkoxy group and aryloxy group; Q, M, X, $R^5$, $R^6$, $R^7$, L and q have the same meanings as in claim 1).

3. The method for producing a copolymer as claimed in claim 2, wherein Q in formula (C2) is —SO$_2$—O— (in which S bonds to $Y^1$ and O bonds to M).

4. The method for producing a copolymer as claimed in claim 3, wherein the catalyst represented by formula (C2) is represented by formula (C3)

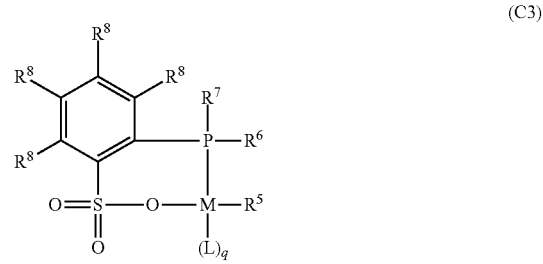

(C3)

(in the formula, four $R^8$s independently represent a hydrogen atom, alkyl group having 1 to 8 carbon atoms, alkoxy group having 1 to 8 carbon atoms, aryloxy group having 6 to 18 carbon atoms or a halogen atom; and M, $R^5$, $R^6$, $R^7$, L and q have the same meanings as in claim 1).

5. The method for producing a copolymer as claimed in claim 4, wherein both of $R^6$ and $R^7$ in formula (C3) represent cyclohexyl group, cyclopentyl group, isopropyl group, o-methoxyphenyl group, 2',6'-dimethoxy-2-biphenyl group; and all of $R^8$s are a hydrogen atom or one of $R^8$s is ethyl group while the other three $R^8$s are a hydrogen atom.

6. The method for producing a copolymer as claimed in claim 1, wherein M is Pd.

7. The method for producing a copolymer as claimed in claim 1, wherein X is P.

* * * * *